United States Patent
Gendron et al.

(10) Patent No.: US 11,320,014 B2
(45) Date of Patent: May 3, 2022

(54) ARTICULATING ELEMENT FOR FILTERING AND DAMPING VIBRATIONS AND ARTICULATING DEVICE

(71) Applicant: ContiTech Vibration Control GmbH, Hannover (DE)

(72) Inventors: Stéphane Gendron, Paimpont (FR); Roland Hercouet, Breal Sous Monfort (FR); Frederic Canevet, Clayes (FR); Anthony Talhouët, Toulouse (FR)

(73) Assignee: ContiTech Vibration Control GmbH, Hannover (DE)

( * ) Notice: Subject to any disclaimer, the term of this patent is extended or adjusted under 35 U.S.C. 154(b) by 0 days.

(21) Appl. No.: 17/045,492

(22) PCT Filed: Apr. 17, 2018

(86) PCT No.: PCT/FR2018/050962
§ 371 (c)(1),
(2) Date: Oct. 6, 2020

(87) PCT Pub. No.: WO2019/202217
PCT Pub. Date: Oct. 24, 2019

(65) Prior Publication Data
US 2021/0164531 A1    Jun. 3, 2021

(51) Int. Cl.
*F16F 1/38*  (2006.01)
*B60K 5/12*  (2006.01)

(52) U.S. Cl.
CPC .......... *F16F 1/3835* (2013.01); *B60K 5/1208* (2013.01); *F16F 2224/025* (2013.01); *F16F 2234/02* (2013.01)

(58) Field of Classification Search
CPC ...... F16F 1/3835; F16F 1/3807; F16F 1/3814; F16F 1/393; F16F 2234/02; F16F 2224/025; B60K 5/1208

(Continued)

(56) References Cited

U.S. PATENT DOCUMENTS 2,457,058 A * 12/1948 Markowitz ........... F16F 3/0873
                                                    267/140.3
3,235,244 A *  2/1966 Hein .................... E02B 3/26
                                                    267/153

(Continued)

FOREIGN PATENT DOCUMENTS

EP    1961988 A2    8/2008
JP    2002021931 A  1/2002
JP    2006160008 A  6/2006

OTHER PUBLICATIONS

International Search Report of International Application PCT/FR2018/050962 on which this application is based.

*Primary Examiner* — Robert A. Siconolfi
*Assistant Examiner* — James K Hsiao
(74) *Attorney, Agent, or Firm* — Gregory Adams; David L. Cate

(57) ABSTRACT

The invention relates to an articulation (1) for damping vibrations between an inner mechanical element and an outer mechanical element, comprising a rigid inner reinforcement (2), a rigid outer reinforcement (3), and a ring (4) made of at least one vibration damping elastomer material, which ring radially extends around the axial direction (X) between the inner reinforcement (2) and the outer reinforcement (3). The invention is characterized in that the first side flank (41) of the ring (4) comprises a first ring portion (51, 52) defined by a first surface (411, 412) and a second ring portion (53, 54) defined by a second surface (413, 414), which are diametrically opposed in relation to the axial direction (X) and which have, in the axial direction (X), respectively a first axial elevation (X1, X2) and a second axial elevation (X3, X4), which is higher than the first axial elevation (X1, X2).

14 Claims, 17 Drawing Sheets

(58) Field of Classification Search
USPC .................................................. 267/141.2
See application file for complete search history.

(56) References Cited

U.S. PATENT DOCUMENTS

| | | | | |
|---|---|---|---|---|
| 3,787,102 | A * | 1/1974 | Moran | F16F 1/38 384/221 |
| 4,465,296 | A * | 8/1984 | Shiratori | B60G 15/068 267/220 |
| 5,190,269 | A * | 3/1993 | Ikeda | F16F 1/387 267/140.12 |
| 5,299,790 | A * | 4/1994 | Whightsil, Sr. | E21B 19/006 267/292 |
| 5,356,121 | A * | 10/1994 | Ikeda | F16F 13/1436 248/638 |
| 5,743,509 | A * | 4/1998 | Kanda | F16F 1/38 248/634 |
| 5,899,431 | A * | 5/1999 | Lefol | F16F 1/387 267/219 |
| 6,293,531 | B1 * | 9/2001 | Kato | F16F 1/371 267/140.12 |
| 6,302,385 | B1 | 10/2001 | Summers, III et al. | |
| 6,698,732 | B2 * | 3/2004 | Takashima | F16F 13/105 267/140.13 |
| 6,705,600 | B2 * | 3/2004 | Yamaguchi | F16F 13/16 267/140.11 |
| 6,729,611 | B2 * | 5/2004 | Deschaume | B60G 7/02 267/140.12 |
| 6,908,076 | B2 * | 6/2005 | Hayashi | B60G 13/003 267/153 |
| 7,165,909 | B2 * | 1/2007 | Buhl | F16F 1/3863 403/132 |
| 7,370,852 | B2 * | 5/2008 | Nicholson | F16F 1/387 267/140.12 |
| 7,506,862 | B2 * | 3/2009 | Siemer | B60G 7/02 267/141 |
| 7,798,722 | B2 * | 9/2010 | Wulf | F16F 1/3605 384/297 |
| 7,922,157 | B2 * | 4/2011 | Hayashi | F16C 27/02 267/141.2 |
| 8,181,945 | B2 * | 5/2012 | Miyahara | F16F 1/387 267/140.12 |
| 8,226,066 | B2 * | 7/2012 | Kubat | F16F 3/093 248/634 |
| 8,556,281 | B2 * | 10/2013 | Lee | B60G 13/003 280/124.155 |
| 8,628,101 | B2 * | 1/2014 | Koide | B60G 7/001 280/124.108 |
| 8,646,761 | B2 * | 2/2014 | Rodecker | F16F 1/50 267/141.4 |
| 8,973,931 | B2 * | 3/2015 | Branger | F16F 1/3828 280/124.13 |
| 9,360,052 | B2 * | 6/2016 | Culver | F16D 1/0864 |
| 10,655,703 | B2 * | 5/2020 | Akiyama | F16F 9/54 |
| 2002/0154940 | A1 * | 10/2002 | Certain | F16F 1/50 403/24 |
| 2005/0200064 | A1 * | 9/2005 | Klein | F16F 1/3814 267/293 |
| 2006/0012092 | A1 * | 1/2006 | Siemer | B60G 7/02 267/141.2 |
| 2007/0063401 | A1 * | 3/2007 | Rodecker | F01N 13/1822 267/292 |
| 2007/0235912 | A1 | 10/2007 | Sato et al. | |
| 2008/0196987 | A1 * | 8/2008 | Niwa | F16F 1/3828 188/379 |
| 2011/0091142 | A1 * | 4/2011 | Reihle | F16C 27/06 384/456 |
| 2012/0098178 | A1 * | 4/2012 | Yahata | F16F 1/3842 267/141.2 |
| 2013/0164077 | A1 * | 6/2013 | Kondor | F16F 1/3835 403/221 |
| 2013/0200587 | A1 * | 8/2013 | Branger | B60G 7/005 280/124.13 |
| 2015/0323030 | A1 * | 11/2015 | Kim | F16F 1/3828 267/141.2 |
| 2015/0377312 | A1 * | 12/2015 | Russell | F16F 1/38 384/125 |
| 2016/0116016 | A1 * | 4/2016 | Hermann | F16F 9/362 267/141.2 |
| 2016/0208879 | A1 * | 7/2016 | Conrad | F16C 27/063 |
| 2018/0328433 | A1 * | 11/2018 | Nishi | B60K 5/1208 |
| 2019/0234476 | A1 * | 8/2019 | Nakamaru | F16F 1/387 |

\* cited by examiner

ARTICULATING ELEMENT FOR FILTERING AND DAMPING VIBRATIONS AND ARTICULATING DEVICE

The invention relates to an articulation for filtering and damping vibrations.

A field of application of the invention relates to the articulation devices between two elements, in particular in the automotive sector.

Such articulations are known that comprise an inner reinforcement mounted around an inner mechanical element, an outer reinforcement fixed to an outer mechanical element, and a ring made of elastomer material between the two reinforcements, in order to filter and dampen the vibrations between the two elements.

For example, in the automotive sector, the inner element is fixed to the engine of a motor vehicle, whereas the outer element is fixed to the bodywork of this motor vehicle, in order to provide the elastic suspension for the engine on the bodywork.

However, it has been noted that when the articulation experiences a radial excitation, i.e. transverse to the axial direction surrounded by the articulation, of a certain frequency a resonant mode appears on the elastomer portion of the articulation, which generates a significant stiffness peak at this frequency.

It follows that when one of the two elements experiences vibrations, significant vibration energy is transferred from this element to the other element via the articulation and therefore, in the aforementioned example, the vibrations of the engine are transferred to the bodywork of the vehicle.

The aim of the invention is to obtain an articulation for filtering and damping vibrations that can be mounted in an articulation device between the inner element and the outer element, which allows the stiffness peaks due to a resonant mode in the event of radial excitation to be considerably attenuated or removed.

To this end, a first aim of the invention is an articulation for filtering and damping vibrations between an inner mechanical element and an outer mechanical element, the articulation comprising:
  a rigid inner reinforcement, which surrounds an axial direction and which is intended to be fixed to the inner mechanical element that must be inserted therein;
  a rigid outer reinforcement, which surrounds the axial direction and which is intended to be fixed to the outer mechanical element that must surround said outer reinforcement; and
  a ring made of at least one vibration damping elastomer material, which ring radially extends around the axial direction between the inner reinforcement and the outer reinforcement and which is fixed to the inner reinforcement and to the outer reinforcement, the ring comprising a first side flank and a second side flank, which are remote from each other in the axial direction and which join the inner reinforcement to the outer reinforcement. This ring can be, for example, cylindrical or frustoconical shaped.

According to one embodiment of the invention, the first side flank comprises at least one first ring portion defined by at least one first surface and at least one second ring portion defined by at least one second surface, which are diametrically opposed in relation to the axial direction and which have, in the axial direction, respectively at least one first axial elevation and at least one second axial elevation that is higher than the first axial elevation.

By virtue of the invention, the articulation prevents the appearance of a stiffness peak associated with a resonant mode for the radial excitations directed in the transverse direction. The fact that the first axial elevation is lower than the second axial elevation creates a dissymmetry in the ring portions of the elastomer ring in the transverse direction, which prevents amplification of the excitations applied in this transverse direction.

For example, in the case of an engine of a motor vehicle suspended from its bodywork by the articulation and for a horizontal axial direction, the fact that the first ring portion defined by the first surface and the second ring portion defined by the second surface can be disposed one above the other prevents the development of a resonance peak for the radial excitations directed in the vertical direction. The articulation thus allows the vibrations from the engine to be prevented from being amplified and transferred from the engine to the bodywork by means of the articulation.

A plurality of transverse directions can be provided that encounter one or more first ring portions defined by one or more first surfaces and one or more second ring portions defined by one or more second surfaces with axial elevations that are different from each other.

According to one embodiment of the invention, the first axial elevation and the second axial elevation are taken in relation to the same transverse portion of the first side flank, the transverse portion being located in the same plane perpendicular to the axial direction and being separate from the first surface and from the second surface.

According to one embodiment of the invention, the first axial elevation and the second axial elevation are taken, for example, in relation to a transverse plane passing through the center of the first side flank.

According to one embodiment of the invention, the first surface and the second surface are respectively located on the first ring portion, axially projecting from the first side flank and, on a second ring portion, axially projecting from the first side flank. According to one embodiment of the invention, the first surface and the second surface are flat. Of course, the flat first surface and second surface also may not be flat, for example, by being round.

According to one embodiment of the invention, the first surface and the second surface are flat and perpendicular to the axial direction.

According to one embodiment of the invention, the first ring portion extends along a first arc of a circle centered on the axial direction, the second ring portion extends along a second arc of a circle centered on the axial direction.

According to one embodiment of the invention, the first ring portion and the second ring portion extend in a stepped manner around the axial direction.

According to one embodiment of the invention, the first surface and the second surface cover 360° around the axial direction.

According to one embodiment of the invention, the first side flank comprises a plurality of first surfaces, which are angularly offset around the axial direction and which have first respective axial elevations, which are different from each other, and a plurality of second surfaces, which are angularly offset around the axial direction and which have second respective axial elevations, which are different from each other.

According to one embodiment of the invention, the first side flank comprises, as first ring portions, two flat projections, which axially depart from the first side flank, which extend along two first arcs of a circle centered on the axial direction, the two first surfaces of which are perpendicular to the axial direction, which are angularly offset around the axial direction and which have respective first axial elevations, which are different from each other; and the first side flank comprises, as second ring portions, two flat projections, which axially depart from the first side flank, which extend along two second arcs of a circle centered on the axial direction, the second surfaces of which are perpendicular to the axial direction, which are angularly offset around the axial direction and which have respective second axial elevations, which are different from each other.

According to one embodiment of the invention, the first side flank comprises third surfaces for transitioning between the first surface and the second surface.

A second aim of the invention is an articulation device, characterized in that it comprises a first articulation as described above, a second articulation as described above and an outer mechanical element,
the outer mechanical element comprising a wall demarcating a first housing, in which the outer reinforcement of the first articulation is fitted, and a second housing, in which the outer reinforcement of the second articulation is fitted, the inner reinforcement of the first articulation and the inner reinforcement of the second articulation being aligned and surrounding the same axial direction,
the first axial elevation of the first articulation and the second axial elevation of the first articulation are taken in relation to the same transverse portion of the first side flank of the first articulation or are taken in relation to a first transverse plane passing through the center of the first side flank of the first articulation,
the first axial elevation of the second articulation and the second axial elevation of the second articulation are taken in relation to the same transverse portion of the first side flank of the second articulation or are taken in relation to a second transverse plane passing through the center of the first side flank of the second articulation,
the transverse portion of the first side flank of the first articulation or the first transverse plane being located in the same plane perpendicular to the axial direction and being separate from the first surface of the first articulation and from the second surface of the first articulation,
the transverse portion of the first side flank of the second articulation or the second transverse plane being located in the same plane perpendicular to the axial direction and being separate from the first surface of the second articulation and from the second surface of the second articulation,
the first surface of the first articulation being aligned in the axial direction with the first or second surface of the second articulation having the first or second axial elevation of the second articulation, different from the first axial elevation of the first surface of the first articulation,
the second surface of the first articulation being aligned in the axial direction with the first or second surface of the second articulation having the first or the second axial elevation of the second articulation, different from the second axial elevation of the second surface of the first articulation.

According to one embodiment of the invention, the first side flank of the first articulation and the first side flank of the second articulation are axially rotated outward, the second side flank of the first articulation and the second side flank of the second articulation are axially rotated toward each other.

According to one embodiment of the invention, the articulation device comprises an inner mechanical element, which is fitted in the inner reinforcement of the first articulation and in the inner reinforcement of the second articulation.

The invention will be better understood from reading the following description, which is provided solely by way of a non-limiting example, with reference to the accompanying drawings, in which:

FIGS. 1 to 4 are schematic views, respectively a side view, a perspective view, an axial section view and a perspective axial section view of an articulation according to one embodiment of the invention;

FIGS. 5 to 8 are schematic views, respectively a side view, a perspective view, an axial section view and a perspective axial section view of an articulation device, in which the articulation according to one embodiment of the invention can be mounted, FIG. 9 is a schematic axial section view of a first example of elements, on which the articulation according to one embodiment of the invention can be mounted;

Figure 15:
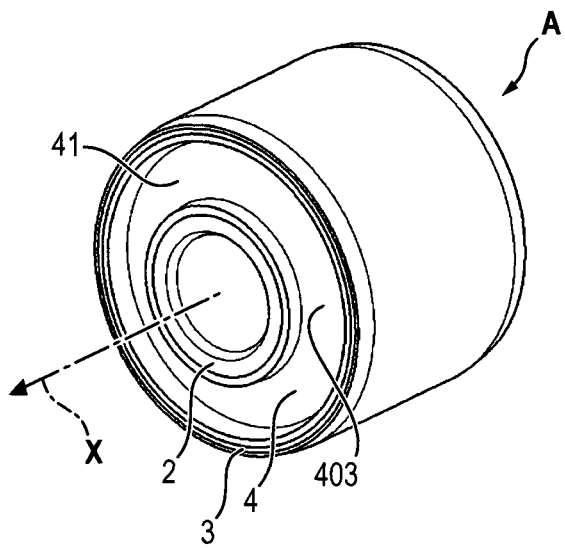
Figure 16:
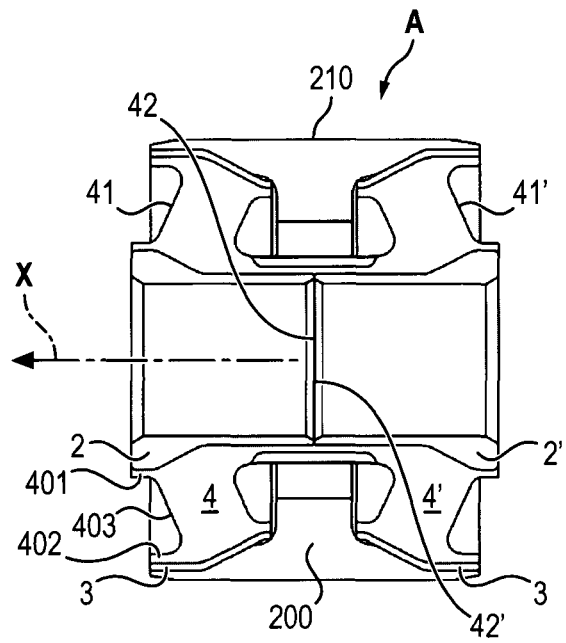
Figure 17:
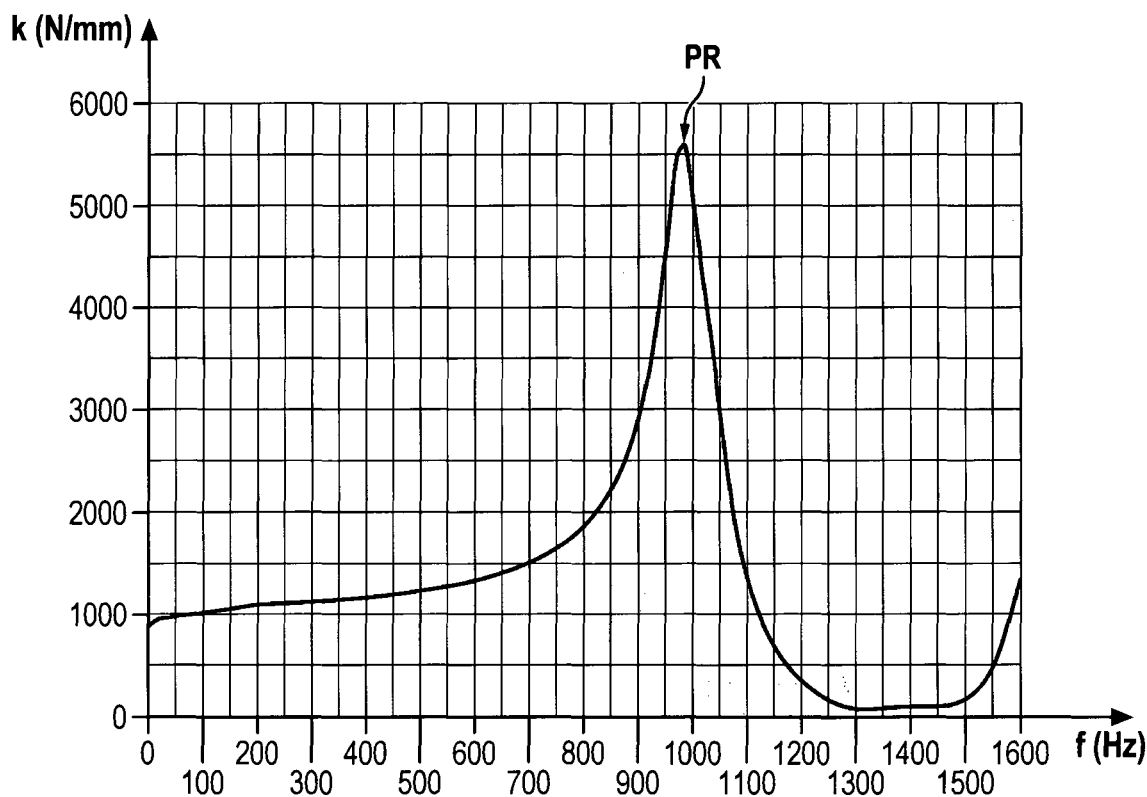
Figure 18:
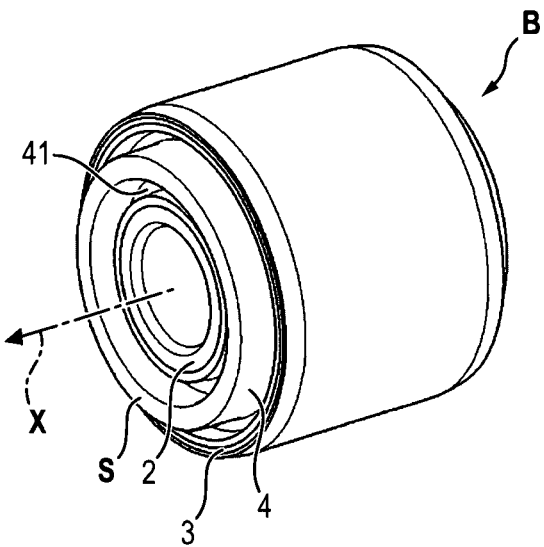
Figure 19:
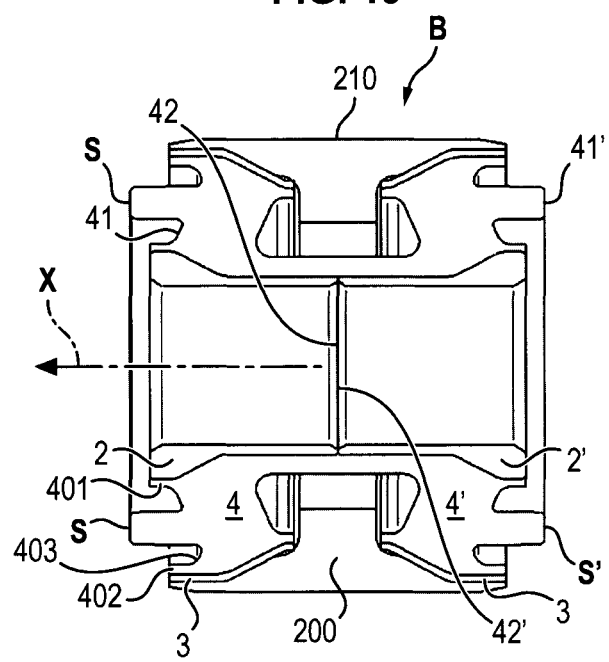
Figure 20:
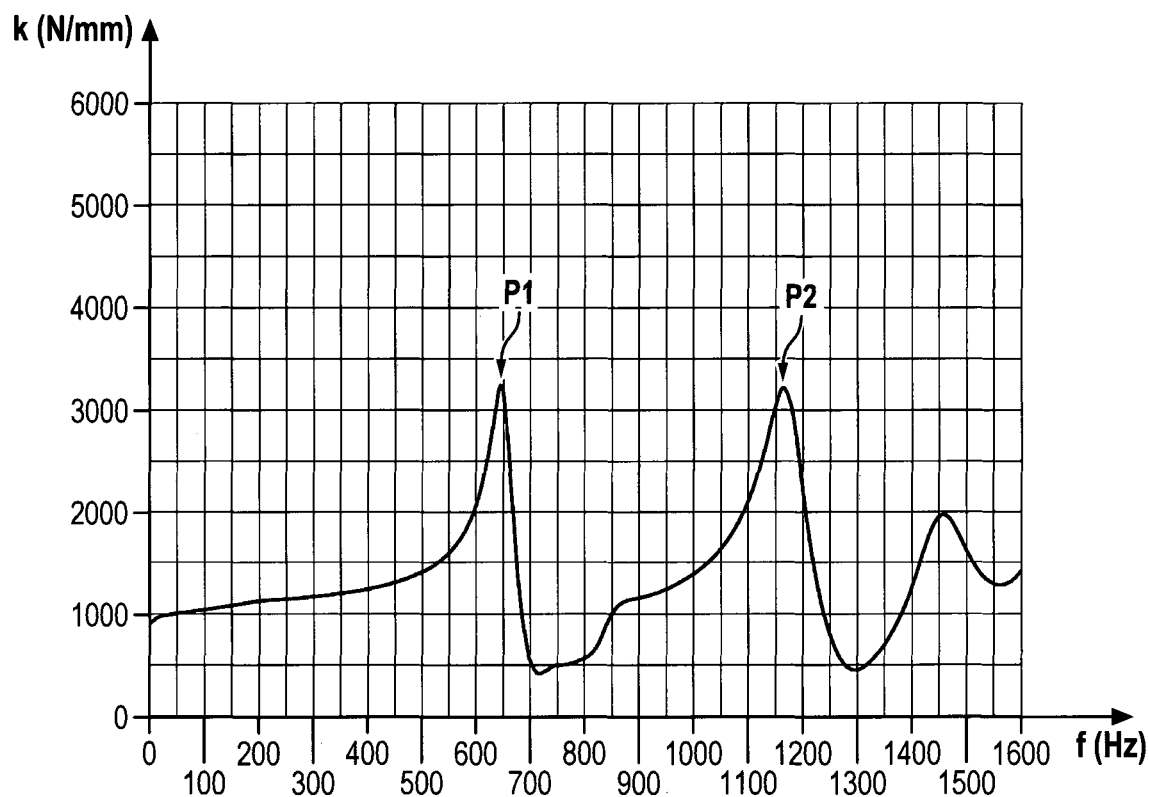
Figure 22:
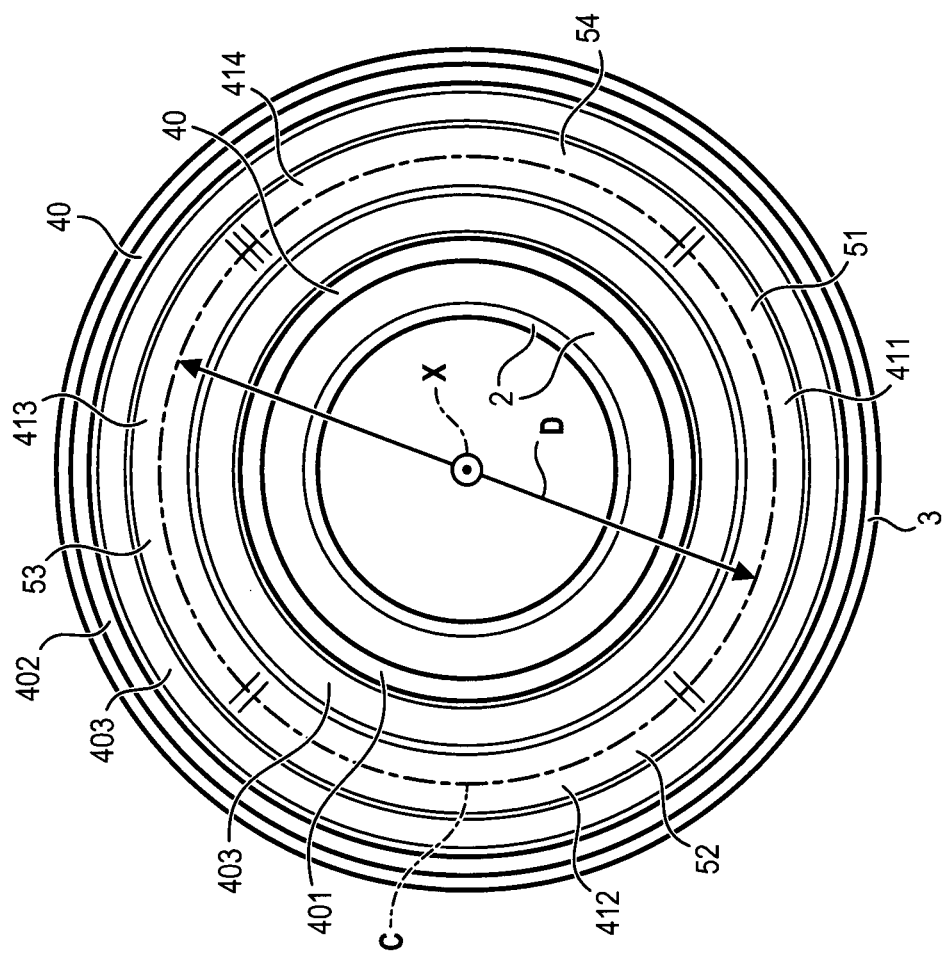
Figure 21:
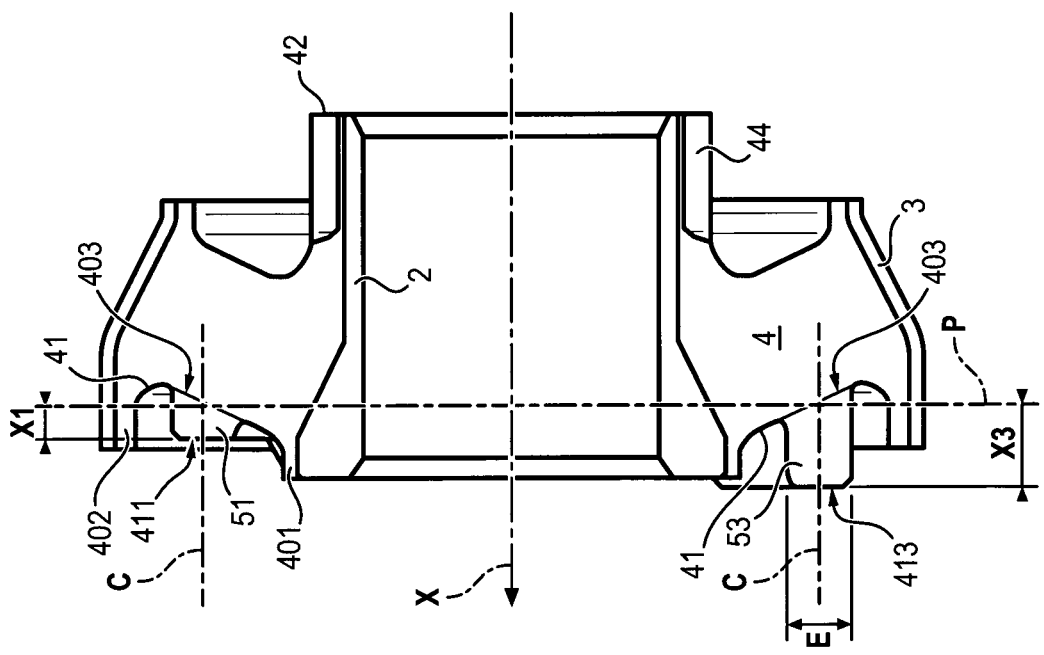

FIGS. 15, 16 and 17 respectively schematically show a side view, an axial section view, and a stiffness measured as a function of the frequency for a first comparative articulation device that does not have the first surface and the second surface according to the invention;

FIGS. 18, 19 and 20 schematically respectively show a side view, an axial section view, and a stiffness measured as a function of the frequency for a second comparative articulation device that does not have the first surface and the second surface according to the invention;

FIGS. 21 and 22 are schematic views, respectively as an axial section view and as a side view, of an articulation according to one embodiment of the invention.

In FIGS. 1 to 13, 21 and 22 the articulation 1 according to the invention comprises a rigid inner reinforcement 2, a rigid outer reinforcement 3, and a ring 4 made of at least one elastomer material.

The rigid inner reinforcement 2 surrounds an axial direction X. This inner reinforcement 2 can be in the form of a tube, for example, with a circular inner transverse section around the axial direction X. The inner reinforcement 2 can be, for example, made of synthetic material, for example, plastic, or can be metal, for example, aluminum.

Figure 9:
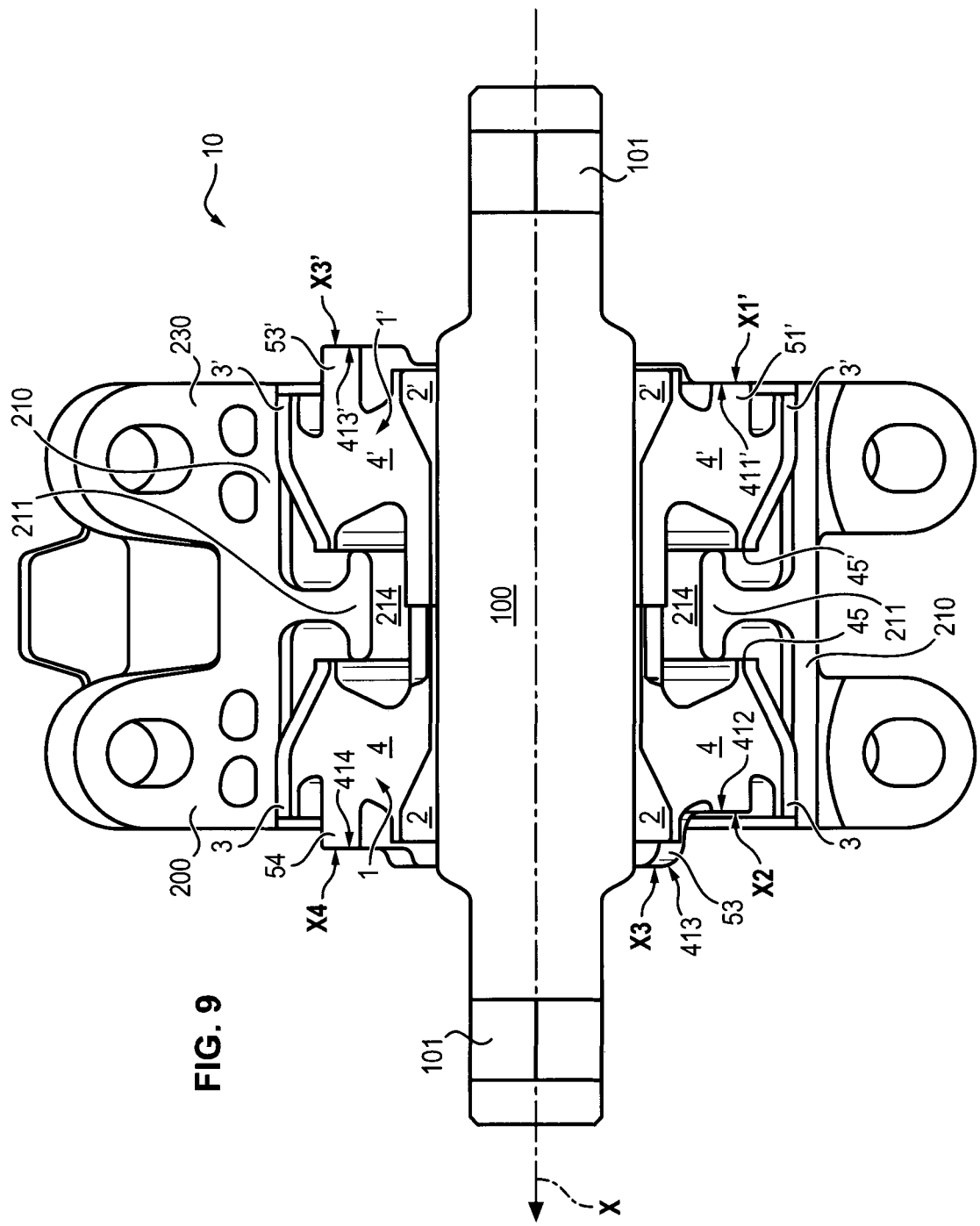
Figure 10:
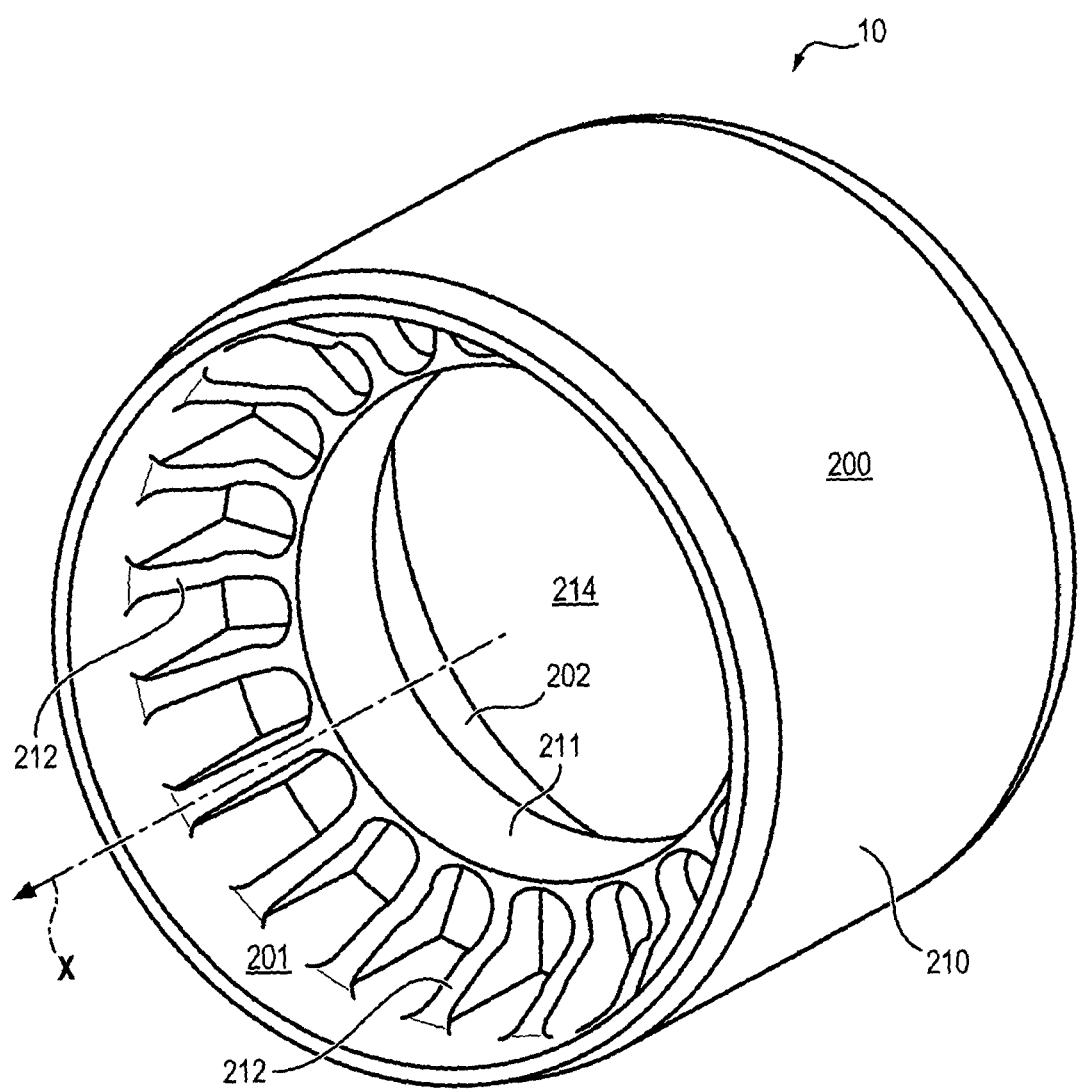
FIG. 10 is a schematic perspective view of a second example of an outer mechanical element of an articulation device, in which the articulation according to one embodiment of the invention can be mounted.
Figure 11:
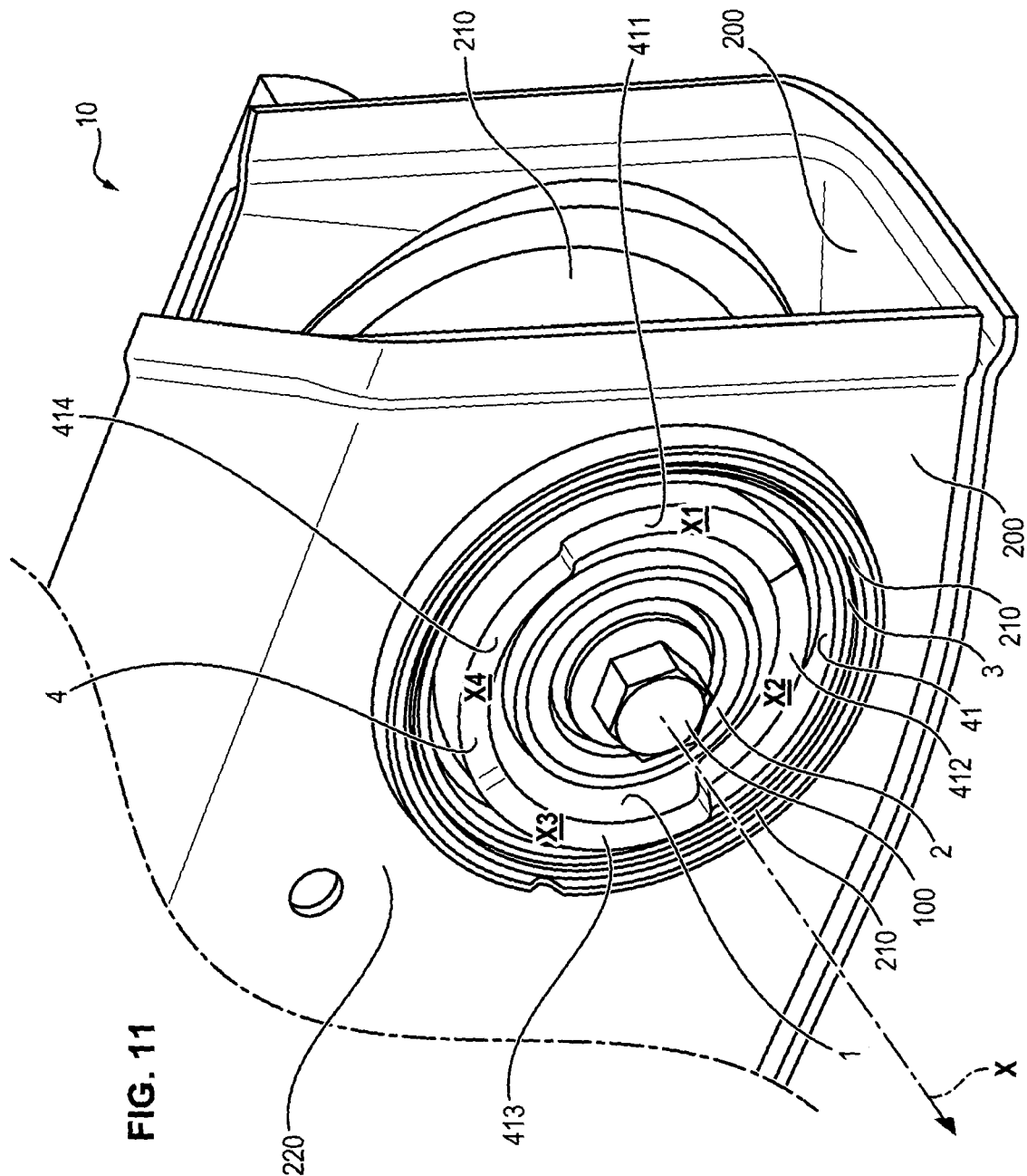
FIG. 11 is a schematic perspective view of a third example of elements, on which the articulation according to one embodiment of the invention can be mounted.
Figure 12:
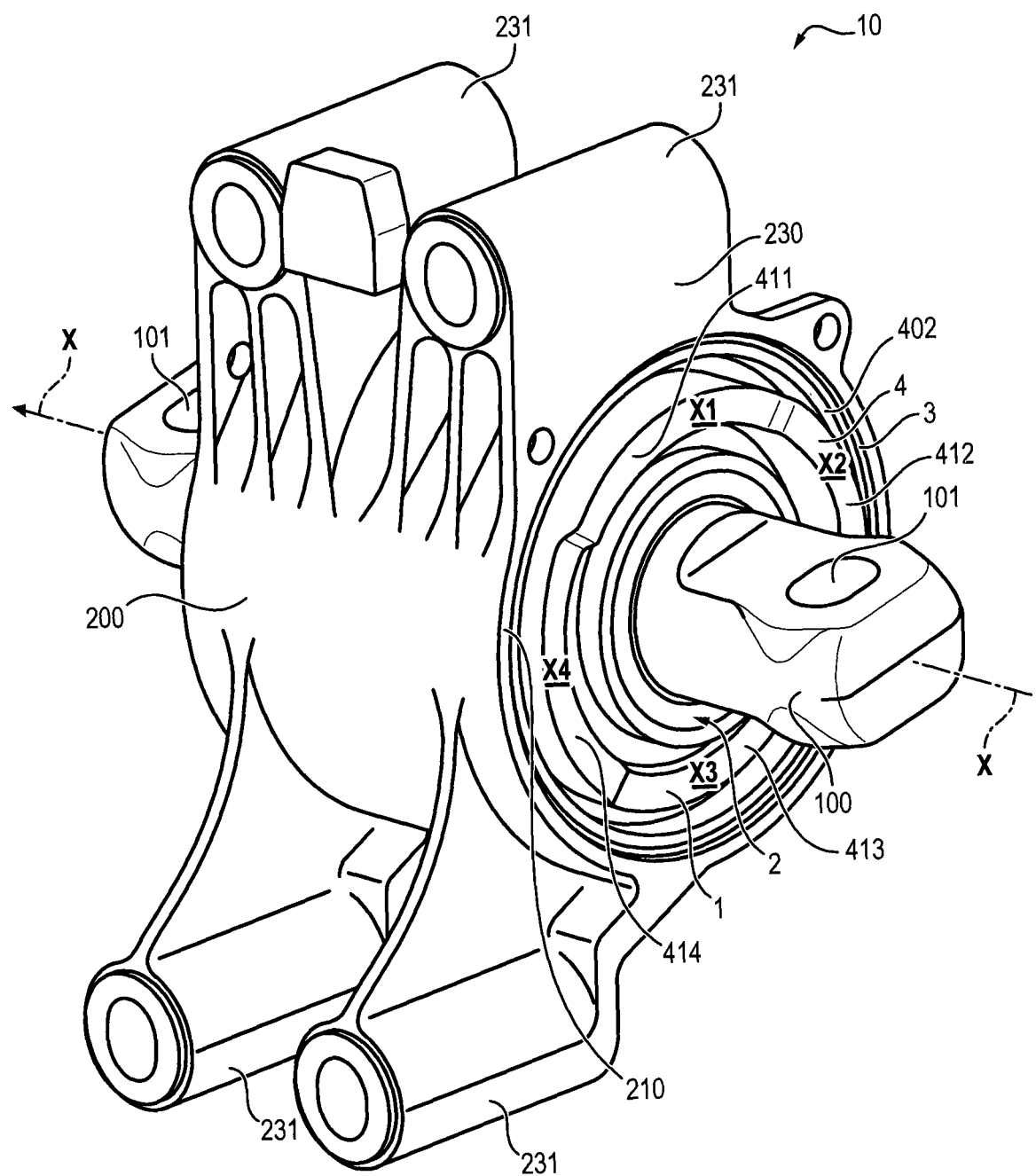
FIG. 12 is a schematic perspective view of a fourth example of elements, on which the articulation according to one embodiment of the invention can be mounted.

The inner reinforcement 2 is intended to be fixed to an inner mechanical element 100, for example, by force fitting. To this end, the inner mechanical element 100 is inserted into the inner reinforcement 2 in the axial direction X. In one embodiment, an inner mechanical element 100 of a motor vehicle can be provided, for example, that is connected to the engine of the motor vehicle, said engine can be an internal combustion or heat engine and/or another type of engine, such as, for example, an electric motor for fully or partly propelling the vehicle. Examples of this inner mechanical element 100 of a motor vehicle engine are shown in FIGS. 9, 11 and 12. Of course, any other type of inner mechanical element 100 can be provided.

The ring 4 made of at least one elastomer material used to dampen vibrations is fixed around the inner reinforcement 2. The ring 4 is fixed, for example, by adhering elastomer material onto the peripheral surface of the inner reinforcement 2. According to one embodiment, the ring 4 is made of or comprises rubber.

A rigid outer reinforcement 3 is fixed around the ring 4. The ring 4 and the outer reinforcement 3 surround the axial direction X. The ring 4 radially extends around the axial direction X between the inner reinforcement 2 and the outer reinforcement 3. The outer reinforcement 3 is intended to be fixed to an outer mechanical element 200, for example, by force fitting. When the outer mechanical element 200 is fixed to the outer reinforcement 3, this outer mechanical element 200 surrounds this outer reinforcement 3 around the axial direction X. In one embodiment, an outer mechanical element 200 for a motor vehicle can be provided, which element is, for example, connected to the bodywork of the motor vehicle. Examples of this outer mechanical element 200 for the bodywork of a motor vehicle are shown in FIGS. 5 to 12. Of course, any other type of outer mechanical element 200 can be provided.

In FIGS. 1 to 22, the axial direction X is a geometrical or hypothetical direction. The transverse directions and the transverse planes are hypothetical and geometrical. The radial directions and the diameters are hypothetical and geometrical. The transverse directions and the transverse planes are perpendicular to the axial direction X. The radial directions and the diameters are transverse directions intersecting the axial direction X. The angles ANG are hypothetical and geometrical and are taken by rotating around the axial direction X. The axial planes are hypothetical and geometrical and are the planes passing through the axial direction X.

A first side flank 41 of the ring 4 and a second side flank 42 of the ring 4 join the inner reinforcement 2 to the outer reinforcement 3. The first side flank 41 and the second side flank 42 are remote from each other in the axial direction X.

The first side flank 41 can comprise one or more transverse edge portion(s) 40, which is/are located in the same transverse plane and which can be circular around the axial direction X. For example, an inner collar 401 can be provided as a transverse edge portion 40, which collar extends around the axial direction X against the inner reinforcement 2. The transverse edge portion 40 of the first side flank 41 can also comprise an outer collar 402 extending around the axial direction X against the outer reinforcement 3. Between the inner collar 401 and the outer collar 402, the first side flank 41 comprises a flank 403, called intermediate flank 403.

The axial direction X is oriented from the second side flank 42 toward the first side flank 41 of the articulation device 10, in which the articulation 1 must be mounted. Hereafter, the axial elevations are taken in the axial direction X oriented from the second flank 42 toward the first flank 41 and can also be called axial heights.

In one embodiment, the inner collar 401 is more advanced in the outer direction X than the second outer collar 402. The intermediate flank 403 is provided in an indentation 404 of the flank 41 between the outer collar 402 and the inner collar 401. The flank 403 is, for example, inclined by rising from the inner collar 401 to the outer collar 402, the flank 403 can be partially conical.

According to the invention, the first side flank 41 comprises at least one first ring portion 51 defined by a first surface 411 having a first respective axial elevation X1 and at least one second ring portion 53 defined by a second surface 413, which is diametrically opposed to the first surface 411 in relation to the axial direction X and which has a second axial elevation X3 higher than the first axial elevation X1 in the axial direction X.

The diametrically opposed portions or parts of the first surface 411 or 412 and of the second surface 413 or 414 are separated by an angle ANG of 180° around the axial direction X and are at the same distance from this axial direction X.

Thus, a transverse diameter R (which intersects the axial direction X in a transverse plane) located between the first surface 411 and the second surface 413 encounters two different axial elevations (or axial heights) X1 and X3 in the first side edge 41, as shown in FIGS. 1, 2, 5, 6 and 22.

When a radial excitation is applied, the ring portions 51 and 53 respectively defined by the surfaces 411 and 413 with axial heights X1 and X3 that are different from one another modify the modal behavior of the articulation and thus oppose the establishment of resonance and allow the dynamic stiffness of the articulation 1 to be reduced. The first and second ring portions act as multiple carefully positioned vibration dampers (beaters). This allows the level of the mode of the elastomer ring to be attenuated and consequently allows the transmission of vibrations from the inner reinforcement 2 to the outer reinforcement 3 (or vice versa), and thus to their mechanical environment, to be reduced by the elements 100 and 200.

The diameter R can be, for example, a vertical direction. For example, the articulation 1 can be disposed so that the second ring portion 53 and the ring portion 51 are vertical to each other.

The first axial elevation X1 and the second axial elevation X3 can be taken, for example, in relation to the transverse portion 40 of the first lateral edge 41, which has its own constant axial elevation around the axial direction X. The transverse portion 40 is separate from the first surface 411 and from the second surface 413. For example, the first axial elevation X1 and the second axial elevation X3 are taken in relation to the inner collar 401 or in relation to the outer collar 402, which each have their own constant axial elevation around the axial direction X.

Figure 1:
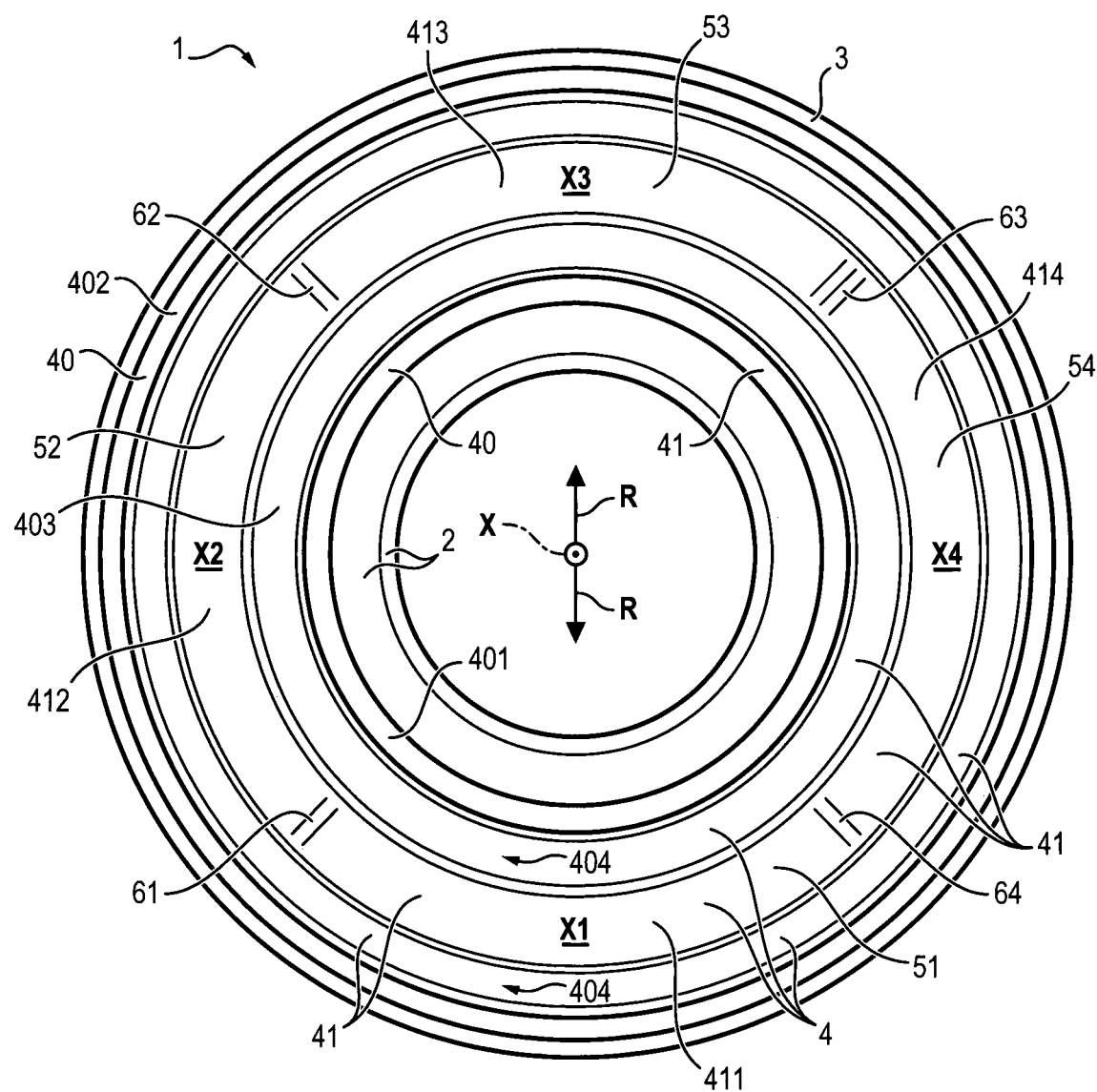
Figure 2:
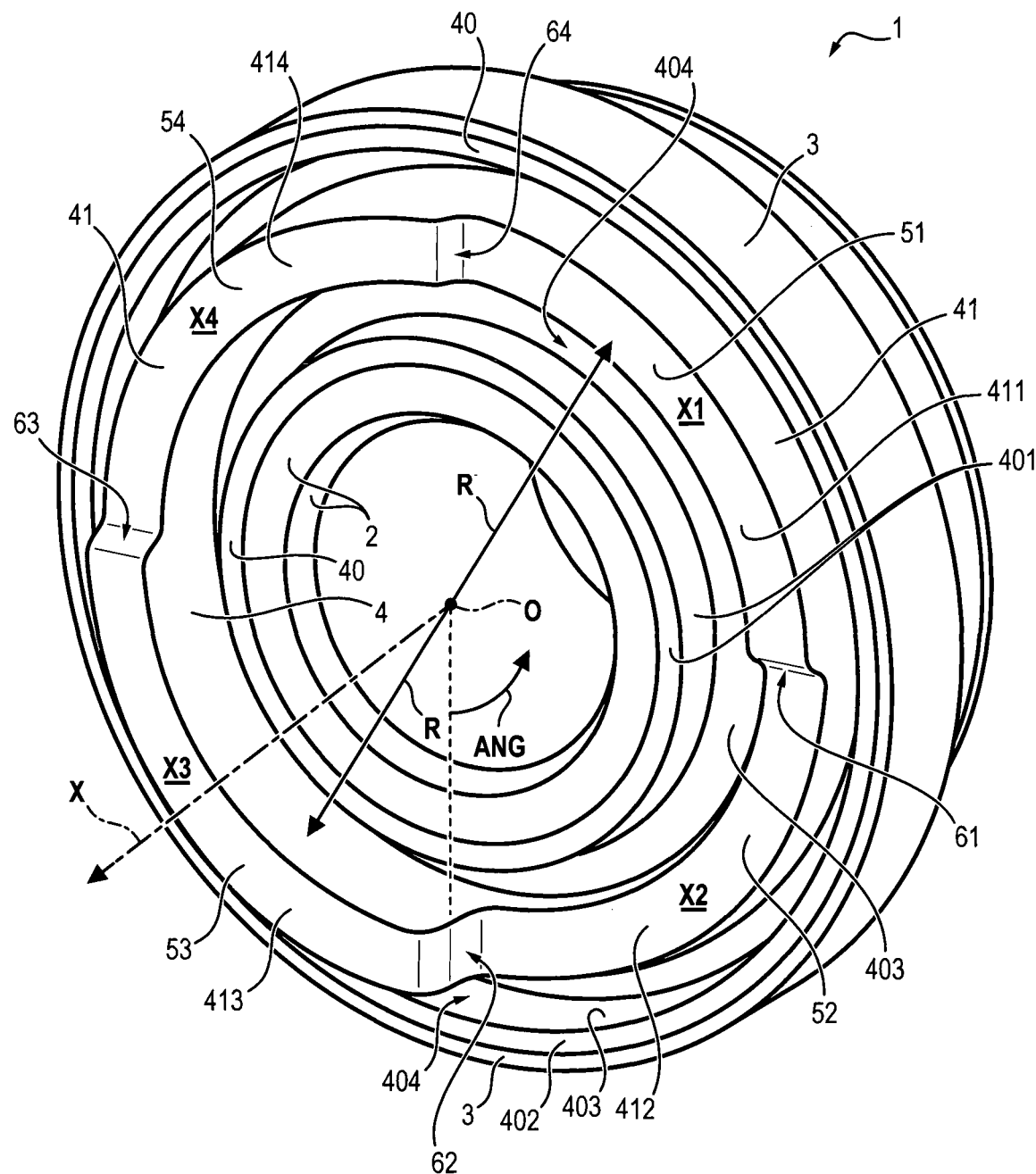
Figure 3:
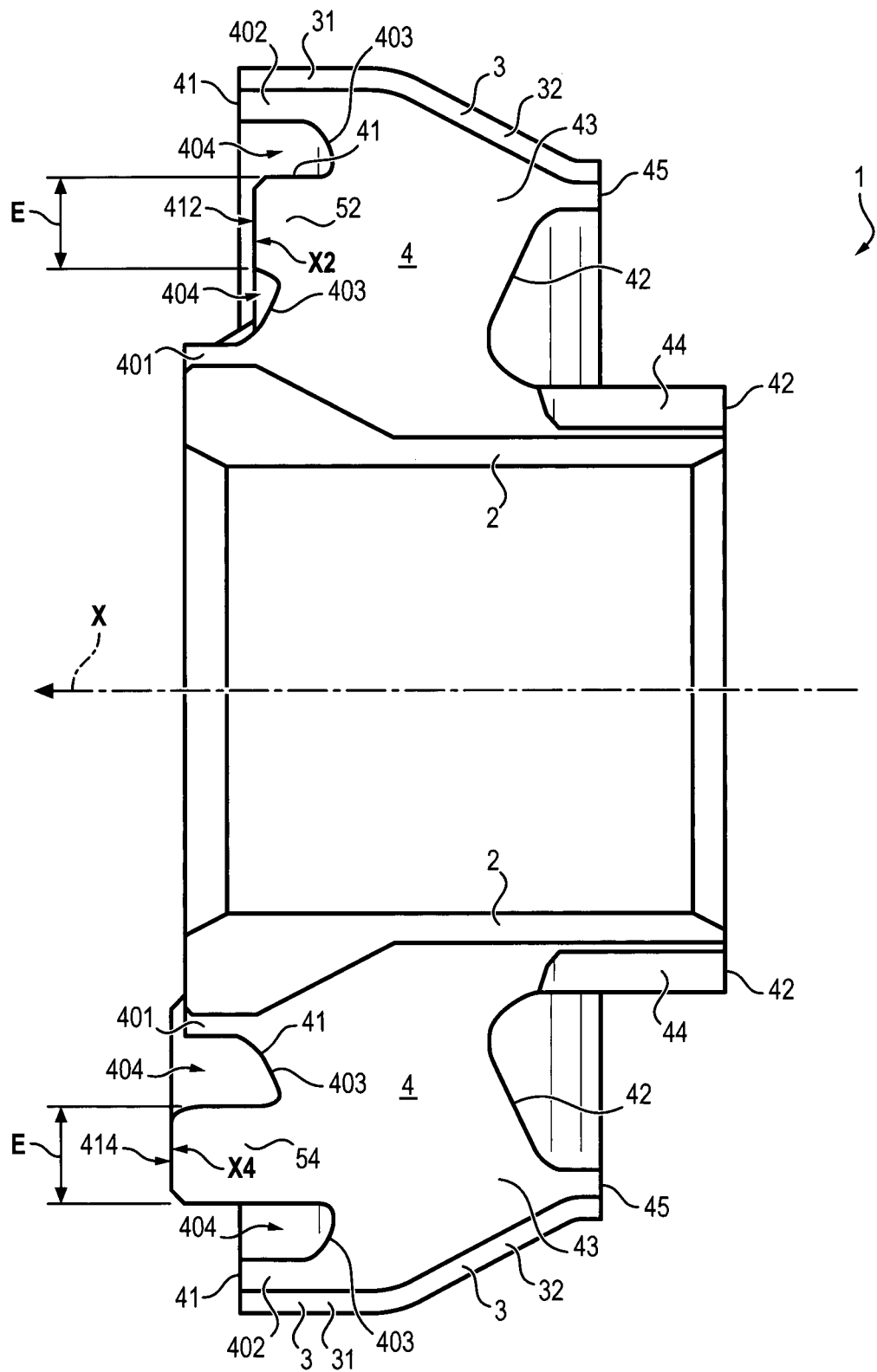
Figure 4:
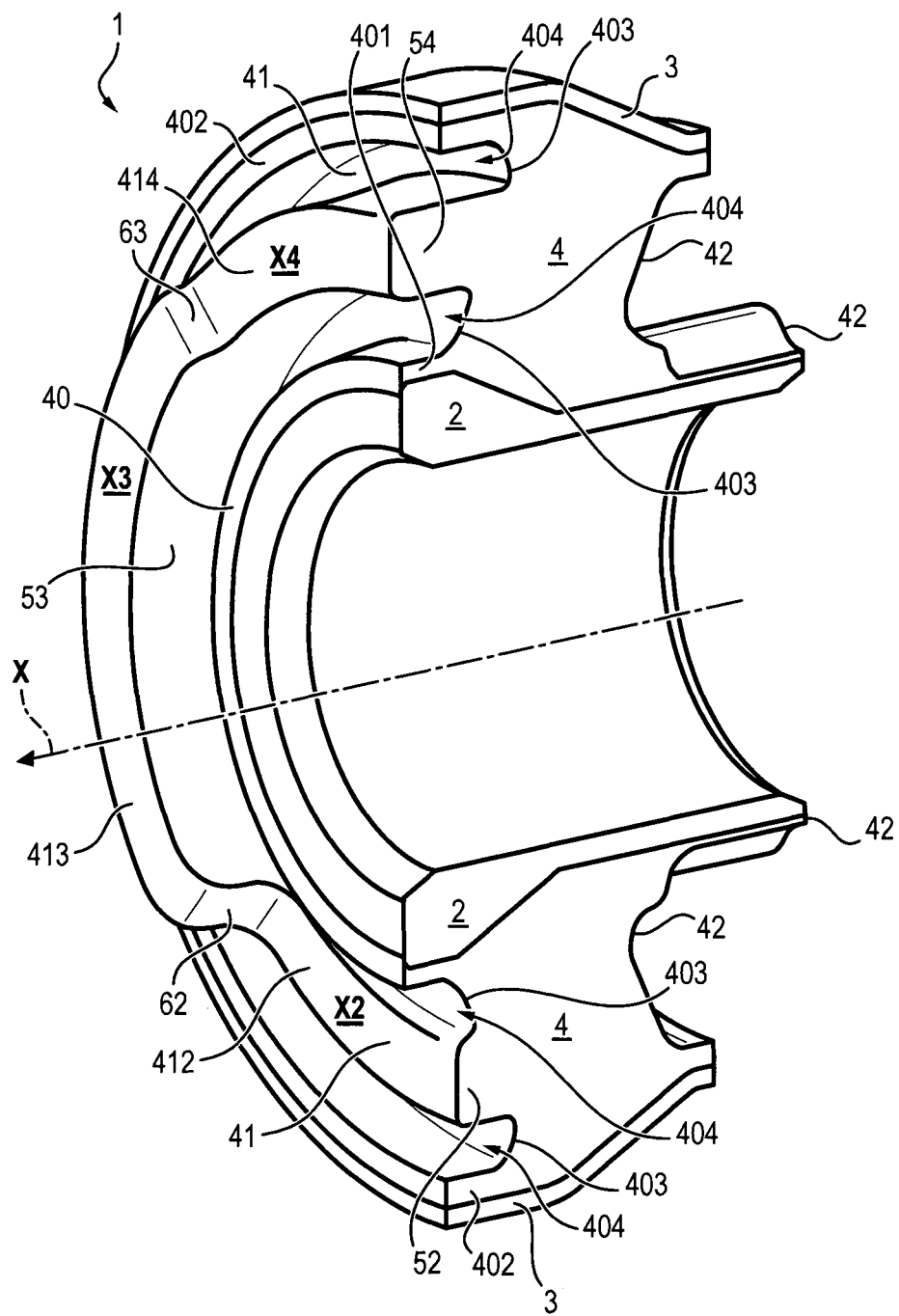
Figure 5:
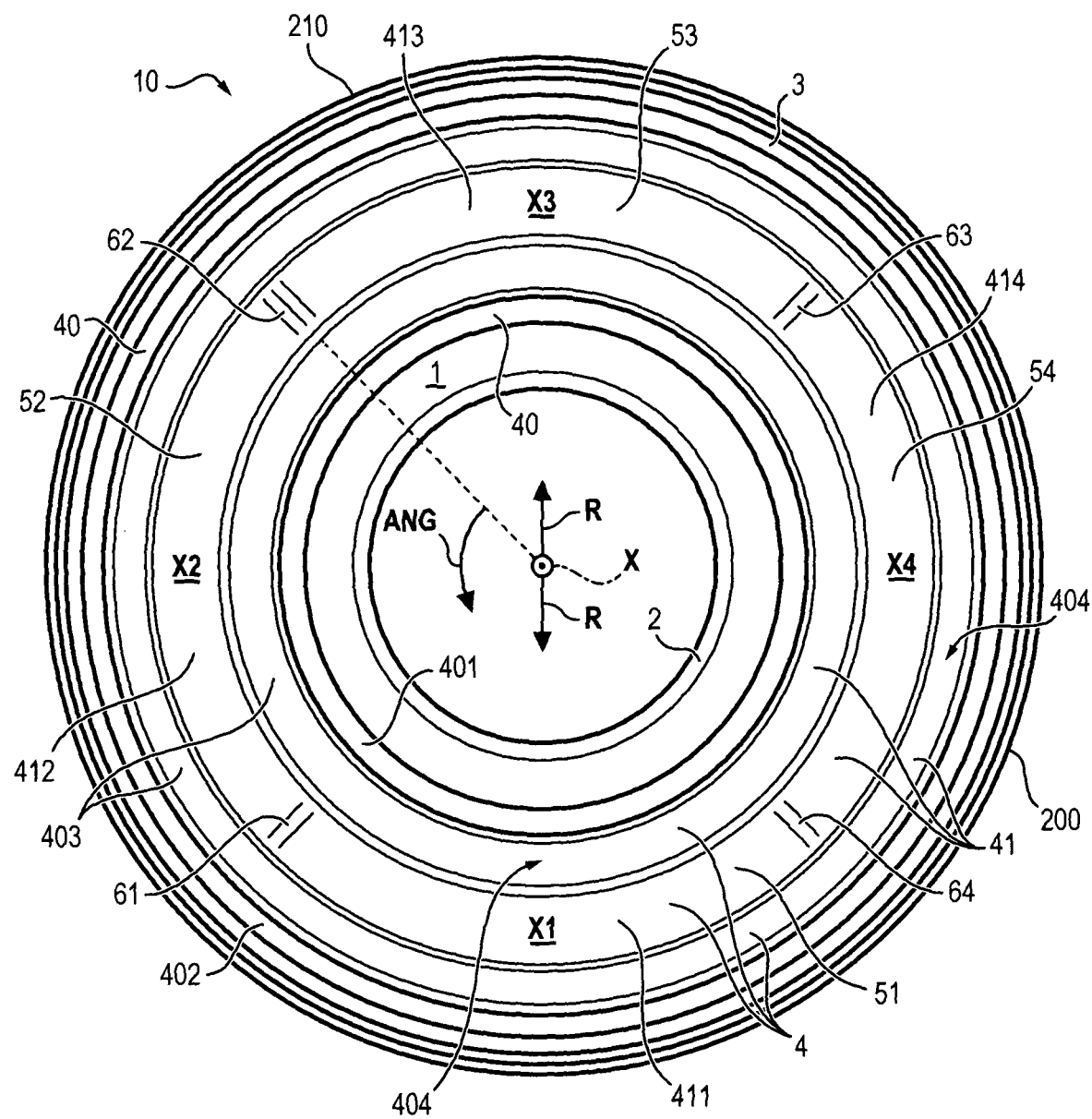
Figure 6:
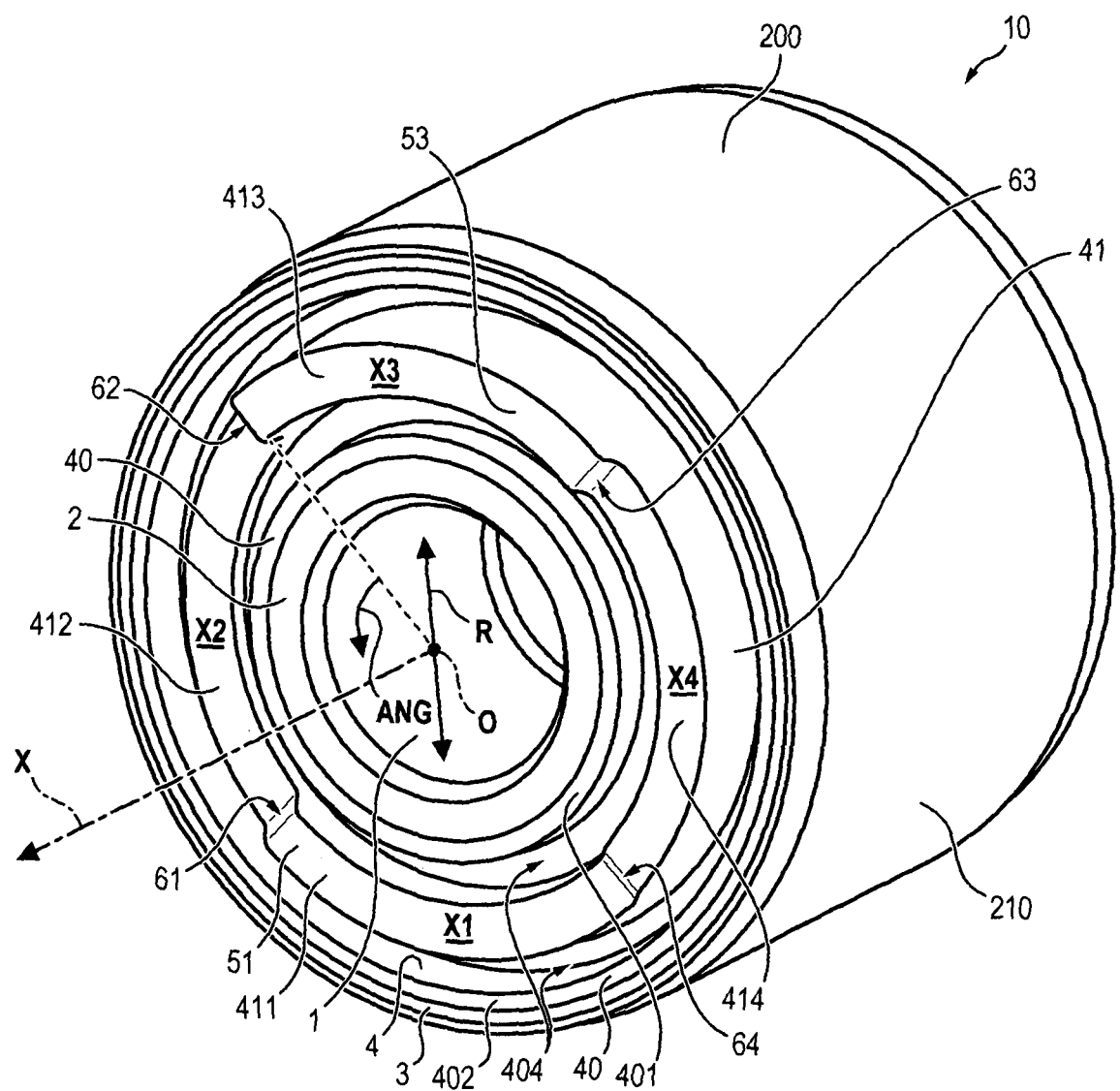

The ring portions 51 and 53 (and/or the ring portions 52 and 54 described above) can have the same transverse thickness E and/or be located approximately at the center of the side 41 and/or 403, with this thickness E being shown in FIGS. 3 and 21. A plurality of different masses 51 and 53 (and/or 52 and 54) modifying the modal behavior of the articulation 1 is obtained.

Figure 7:
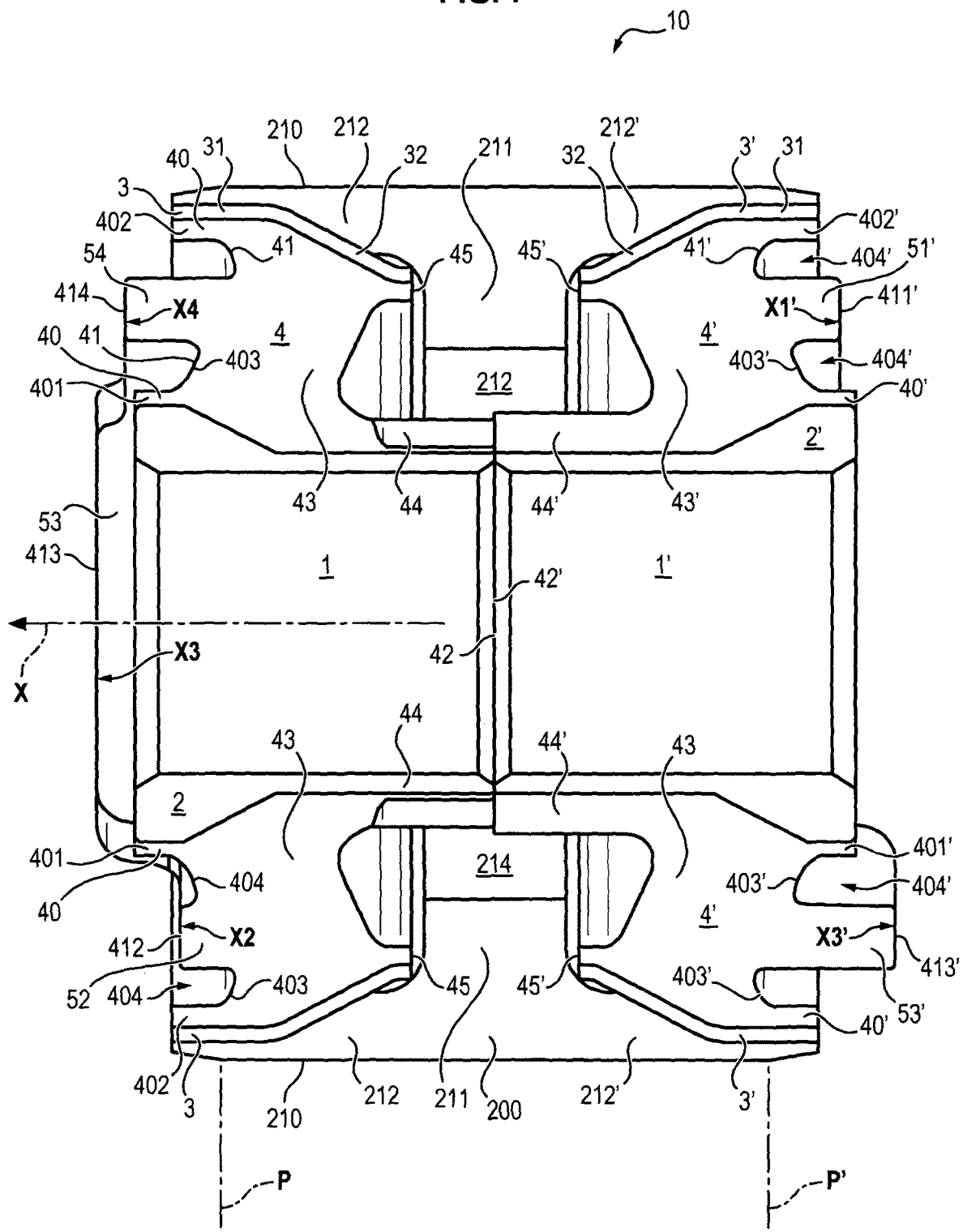

In FIGS. 7, 21 and 22, the first axial elevation X1 and the second axial elevation X3 can be taken, for example, in relation to a transverse plane P passing through the flank 403. This transverse plane P passes, for example, through the intersection of the flank 41 and of a cylinder C of diameter D passing through the center of the flank 41 and/or 403 and/or passing through the center of the ring portions 51 and 53 (and/or the center of the ring portions 52 and 54).

In one embodiment shown in FIGS. 1 to 13, 21 and 22, the transverse width of the second side flank 42 is less than that of its first side flank 41. The ring 4 comprises a first ring portion 43 located on the side of the first side flank 41 and a second ring portion 44 located on the side of the second side flank 42 and connected to the first ring portion 43, with the transverse width of the second ring portion 44 being less than that of the first ring portion 43. The second rear ring portion 44 can be axially ribbed. Between the first side flank 41 and the second side flank 42, the first ring portion 43 comprises an intermediate edge 45 with a transverse width ranging between that of the first flank 41 and that of the second flank 42. The outer reinforcement 3 externally covers the first ring portion 43, from the first lateral edge 31 to the intermediate side 45. The outer reinforcement 3 comprises a front portion 31 (for example, a circular cylindrical portion and covering the outer collar 402), which starts from the first side flank 41 and extends up to the intermediate edge 45 via a rear portion 32 with a transverse width that narrows, for example, in a frustoconical manner. In other embodiments, the rear portion 32 can be cylindrical around the axial direction X or can assume another shape.

In one embodiment shown in FIGS. 1 to 13, 21 and 22, a plurality of ring portions 51 and 52 can be provided that are respectively defined by first surfaces 411, 412, which are angularly offset around the axial direction X and which have first respective axial elevations X1, X2, which are different from each other, and, for example, two first ring portions 51 and 52 respectively defined by the first surfaces 411 and 412 and two second ring portions 53 and 54 respectively defined by the second surfaces 413 and 414. A plurality of second ring portions 53 and 54 can be provided, which portions are each diametrically opposed to the first respective ring portions 51 and 52, which are angularly offset around the axial direction X and which have respective second axial elevations X3, X4 that are different from each other. The second axial elevation X4 of the second surface 414 is higher than the first axial elevation X2 of the first surface 412. These other first and second surfaces 412 and 414 allow the angular operating range of the articulation 1 to be extended around the axial direction X. It is possible to have, for example, 0<X2<X1<X4<X3, as shown in FIGS. 1 to 13, 21 and 22. Of course, only one, two or more than two first ring portions 51 can be provided. Of course, only one, two or more than two second ring portions 53 can be provided.

In one embodiment shown in FIGS. 1 to 13, 21 and 22, the first surface 411 is located on a first ring portion 51 axially projecting from the flank 403 and the second surface 413 is located on a second ring portion 53 axially projecting from the flank 403 and/or the first surface 412 is located on another first ring portion 52 axially projecting from the flank 403 and/or the second surface 414 is located on another second ring portion 53 axially projecting from the flank 403. The first surface 411 and/or the second surface 413 and/or the first surface 412 and/or the second surface 414 can be, for example, flat, for example, perpendicular to the axial direction X, as shown in FIGS. 1 to 13, 21 and 22. The first surface 411 and/or 412 and the second surface 413 and/or 414 extend, for example, in a stepped manner around the axial direction X. In other examples, not shown, the first surface 411 and/or the second surface 413 and/or the first surface 412 and/or the second surface 414 are not flat and can be round or another shape, for example.

In one embodiment shown in FIGS. 1 to 13, 21 and 22, the first ring portion 51 defined by the surface 411 extends along a first arc of a circle centered on the axial direction X and the second ring portion 53 defined by the surface 413 extends along a second arc of a circle centered on the axial direction X and/or the first ring portion 52 defined by the surface 412 extends along another first arc of a circle centered on the axial direction X and/or the second ring portion 54 defined by the surface 414 extends along another second arc of a circle centered on the axial direction X.

For example, the first ring portion 51 and/or 52 and the second ring portion 53 and/or 54 cover an angle ANG of 360° around the axial direction X. This thus ensures that, irrespective of the arrangement of the first ring portion 51 and/or 52 and of the second ring portion 53 and/or 54 around the horizontally disposed axial direction X, the vertical direction intersecting the axial direction X will always encounter a portion of the first surface 411 and/or 412 and a portion of the second surface 413 and/or 414 with axial elevations that are different from each other in order to oppose the establishment of resonance in the event of vertical excitation. Thus, according to one embodiment, a ring is added to the flank 41 and/or 403, which ring is made up of the ring portions 51, 52, 53 and 54 with different masses modifying the modal behavior of the articulation 1.

In one embodiment shown in FIGS. 1 to 13, 21 and 22, the first side flank 41 can comprise a third transition surface 61 rising from the first surface 412 to the first surface 411, a third transition surface 62 rising from the first surface 412 to the second surface 413, a third transition surface 63 descending from the second surface 413 to the second surface 414 and a third transition surface 64 descending from the second surface 414 to the first surface 411. These transition surfaces 61, 62, 63, 64 have, for example, pitches of more than 45° and have, for example, a gentle pitch in relation to a transverse plane, for example, a pitch of less than 20° in relation to the axial direction X, or are substantially axial.

Figure 13:
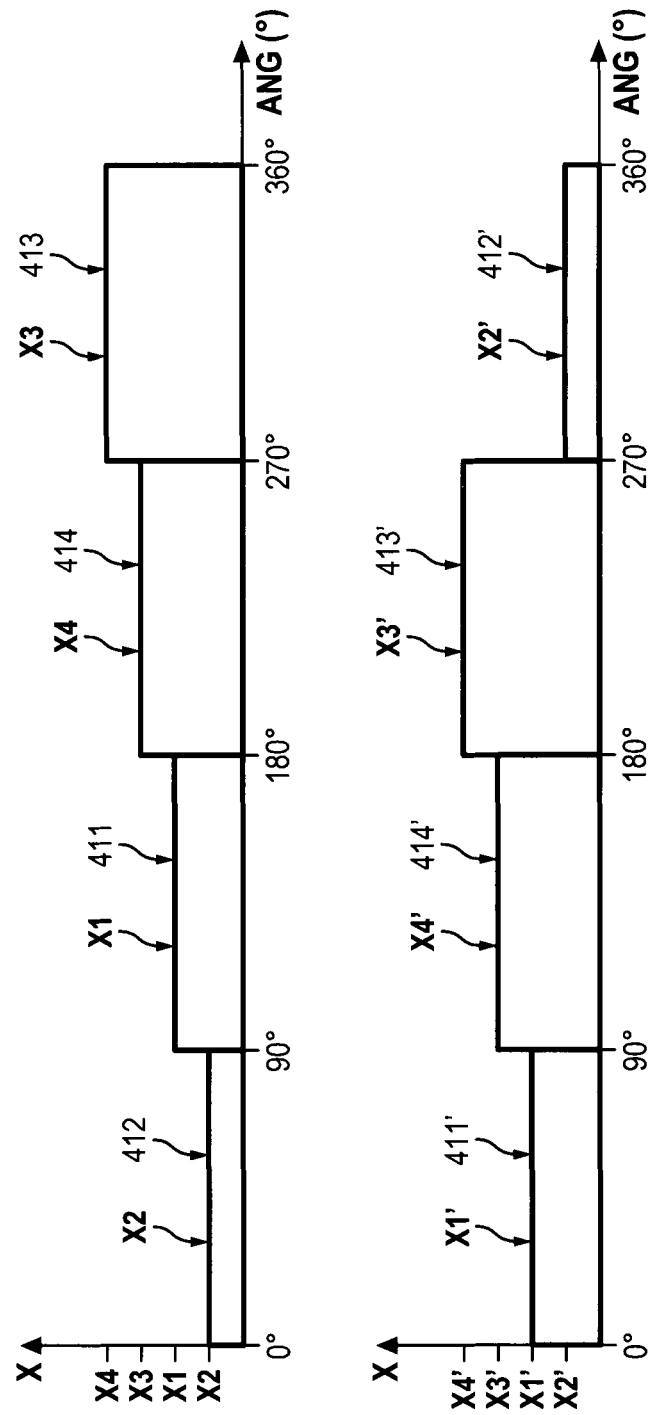
FIG. 13 shows an enhanced profile of the axial elevations of the first and second ring portions of an articulation according to one embodiment of the invention.

In one embodiment shown in FIGS. 1 to 13, 21 and 22, each first ring portion 51 and 52 occupies, for example, an angular sector (ANG) of approximately 90° and each second ring portion 53 and 54 occupies, for example, an angular sector (ANG) of approximately 90°. The axial elevations X1, X2, X3, X4 can be multiples of the same step. The upper part of FIG. 13 represents, by way of example in these cases, on the ordinate X the axial elevations X1, X2, X3 and X4 that are multiples of the same step height, as a function of the angular position ANG of the surfaces 411, 412, 413 and 414 around the axial direction X on the abscissa, for the articulation 1 shown in FIGS. 1 to 12, 21 and 22.

Of course, any shape of the first and second surfaces other than that shown in the figures can be provided.

Figure 14:
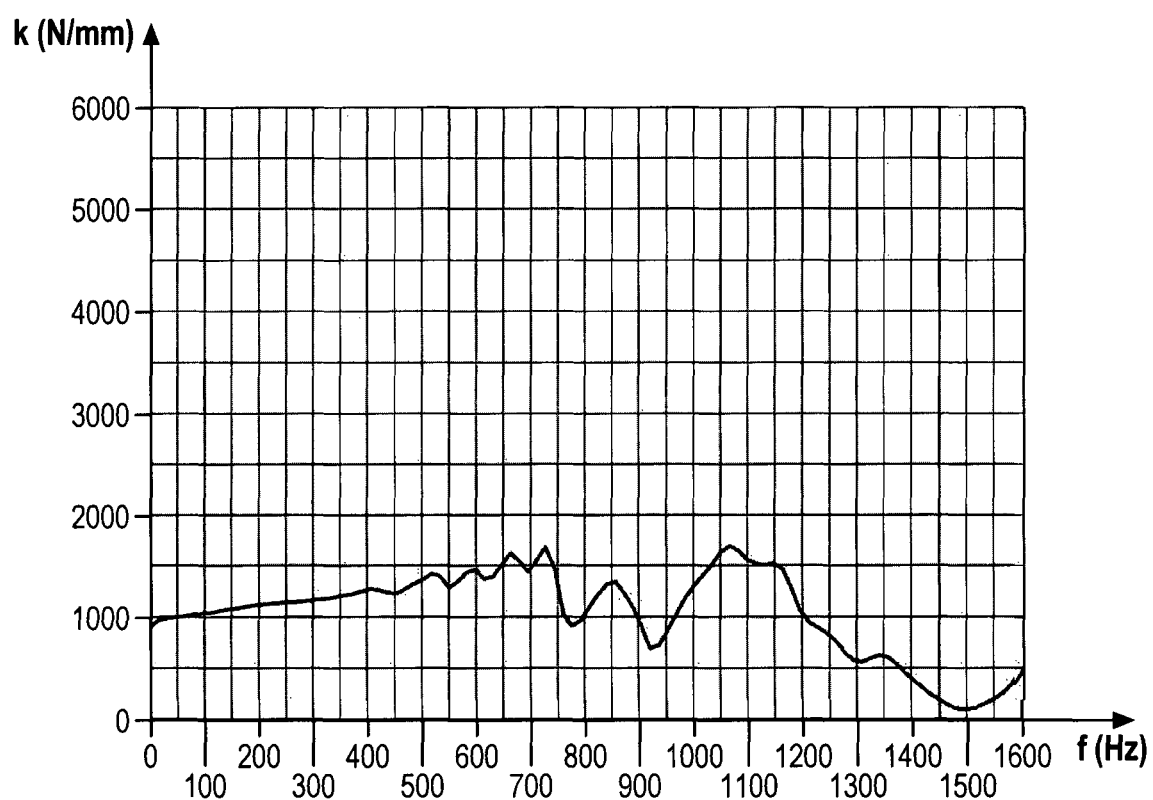
FIG. 14 shows a curve providing a stiffness that has been measured as a function of the frequency for an articulation according to one embodiment of the invention.

FIG. 14 shows, on the ordinate, the dynamic stiffness k measured (in N/mn) as a function of the frequency f on the abscissa (in Hz) on an articulation 1 according to the embodiments described above with reference to FIGS. 1 to 13, 21 and 22. FIG. 14 shows that the stiffness k of the sleeve 1 according to the invention has a relatively flat spectrum of 0 to 1,600 Hz that does not have a significant resonance peak.

On the contrary, FIG. 17 shows, on the ordinate, the dynamic stiffness k measured (in N/mn) as a function of the frequency f on the abscissa (in Hz) for an articulation device A according to FIGS. 15 and 16, which is not according to the invention and which does not comprise the first and second ring portions according to the invention described above with reference to FIGS. 1 to 13, 21 and 22, but which comprises a flank 403 that is strictly conical and does not have projections between the outer collar 402 and the inner collar 401. FIG. 17 shows that this articulation A has a high resonance peak PR of its dynamic stiffness at a frequency of approximately 980 Hz in the case shown.

FIGS. 18 and 19 show another articulation device B, which is not according to the invention and which does not comprise the first and second ring portions according to the invention described above with reference to FIGS. 1 to 13, 21 and 22, but which comprises, on the flank 403, a ring S on its totally flat surface and perpendicular to the axial direction X fully surrounding said direction between the outer collar 402 and the inner collar 401. FIG. 20 shows, on the ordinate, the dynamic stiffness (in N/mn) measured as a function of the frequency on the abscissa (in Hz) for this sleeve B of FIGS. 18 and 19. FIG. 20 shows that this sleeve B comprises a first resonance peak P1 at a frequency of approximately 650 Hz and a second resonance peak P2 for a frequency of approximately 1,150 Hz in the case shown. This articulation device reduces the stiffness level but in lower proportions than the invention.

FIG. 14 thus shows that the invention allows the resonance peaks of FIGS. 17 and 20 to be removed.

In the embodiment of FIGS. 5 to 12, the articulation 1 is mounted in an articulation device 10, also called articulation 10. The articulation device 10 comprises at least one articulation 1 as described above. The articulation device 10 further comprises a second articulation 1' according to the invention, similar to the articulation 1 described above, and the outer mechanical element 200. The articulation device 10 allows the outer mechanical element 200 to be connected in relation to the inner mechanical element 100 and can be used as a device for filtering and damping vibrations between the inner mechanical element 100 and the outer mechanical element 200.

The second articulation 1' is, for example, identical to the articulation 1 of FIGS. 1 to 13, 21 and 22 or is similar to the first articulation 1 of the embodiments described above. The portions forming the second articulation 1' are denoted using the same reference signs as those of the first articulation 1, but also with the reference '.

The outer mechanical element 200 surrounds, around the axial direction X, the outer reinforcement 3 of the first articulation 1 and the outer reinforcement 3' of the second articulation 1'. The outer mechanical element 200 comprises a wall 210 defining a first housing 201, in which the outer reinforcement 3 of the first articulation 1 is fitted, and a second housing 202, in which the outer reinforcement 3' of the second articulation 1' is fitted. In the outer mechanical element 200, the inner reinforcement 2 of the first articulation 1 and the inner reinforcement 2' of the second articulation 2' are aligned and surround the same axial direction X. The wall 210 has, for example, an inner surface (rotated toward the outer reinforcements 3 and 3') that is cylindrical and circular around the axial direction X.

The wall 210 comprises, on its inner surface, a rib 211, which is located so as to project inward and which surrounds the axial direction X and which defines an axial opening 214 passed through by the second lateral edges 42 and 42'. The rib 211 has, for example, a circular axial opening 214 around the axial direction X.

The articulations 1 and 1' are mounted, using their second ring portion 44, 44', one against the other and facing the inner rib 211 in the opening 214, the second side edges 42 and 42' being one against the other in the opening 214. The rib 211 can comprise inclined flanks 212 proceeding from the opening 214 to the inner surface of the wall 201, these inclined flanks 212 being, for example, inclined or frustoconical in the same way as the rear portion 32 in order to act as a support for this rear portion 32. The rib 211 is located between the intermediate edge 45 of the sleeve 1 and the intermediate edge 45' of the sleeve 1'.

As before, the first axial elevation X1 and/or X2 of the first articulation 1 and the second axial elevation X3 and/or X4 of the first articulation 1 are taken in relation to the same transverse portion 40 (for example, 401 or 402) of the first side flank 41 of the first articulation 1, and the first axial elevation X1' and/or X2' of the second articulation 1' and the second axial elevation X3' and/or X4' of the second articulation 1' are taken in relation to the same transverse portion 40' of the first side flank 41' of the first articulation 1', corresponding to the transverse portion 40 (for example, 401' corresponding to 401 or 402' corresponding to 402). As before, this transverse portion 40, 401 or 402 is located in the same plane perpendicular to the axial direction X and is distinct from the first surface 411 and/or 412 and from the second surface 413 and/or 414, the transverse portion 40', 401' or 402' of the first side flank 41' of the second articulation 1' is located in the same plane perpendicular to the axial direction X and is separate from the first surface 411' and/or 412' of the second articulation 1' and from the second surface 413' and/or 414' of the second articulation 1'. The first ring portion 51 is aligned (same angle ANG) in the axial direction X with the first or second ring portion 52' or 53' or 54' of the second articulation 1' having the first or second axial elevation X2' or X3' or X4' of the second articulation 1', which is different from the first axial elevation X1. The second ring portion 52 is aligned in the axial direction X (same angle ANG) with the first or second ring portion 51' or 53' or 54' of the second articulation 2 having the first or second axial elevation X1' or X3' or X4' of the second articulation 1', different from the second axial elevation X2. Thus, any axial plane intersects surfaces of axial elevations that are different from each other. By virtue of this arrangement, the axially aligned ring portions of the first articulation 1 and of the second articulation 1', due to their different axial elevations, oppose the establishment of resonance.

Figure 8:
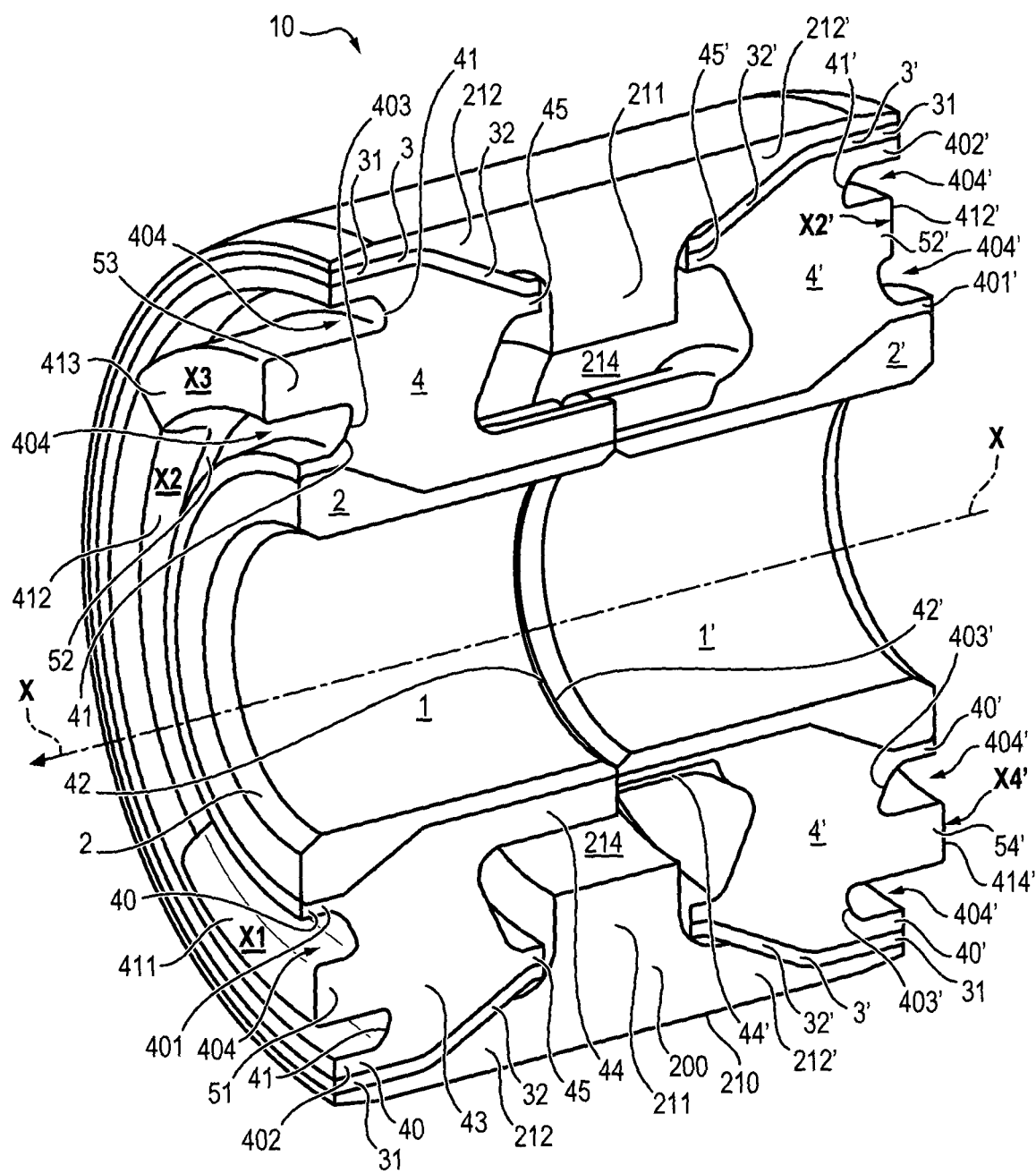

For example, as shown in FIGS. 8, 9 and 13, the first ring portion 51 is axially aligned with the second ring portion 54' of the second articulation 1', the first ring portion 53 is axially aligned with the second ring portion 52' of the second articulation 1', the second ring portion 52 is axially aligned with the first ring portion 51' of the second articulation 1', the second ring portion 54 is axially aligned with the first ring portion 53' of the second articulation 1'.

In another example, shown in FIG. 7, the second ring portion 52 is axially aligned with the first ring portion 53' of the second articulation 1', the second ring portion 54 is axially aligned with the first ring portion 51' of the second articulation 1', the first ring portion 51 is axially aligned with the second ring portion 52' of the second articulation 1', the first ring portion 53 is axially aligned with the second ring portion 54' of the second articulation 1'.

For example, 0<X2<X1<X4<X3 and 0<X2'<X1'<X4'<X3'.

As shown in FIGS. 7, 8 and 9 to 12, in the position for mounting the articulations 1 and 1' in the outer mechanical element 200, the first side flanks 41 and 41' are axially rotated outward. Furthermore, in this embodiment, the articulation device 10 comprises the inner mechanical element 100, which is fitted into the inner reinforcement 3 of the first articulation 1 and into the inner reinforcement 3' of the second articulation 1'. The inner mechanical element 100 therefore axially passes through the inner reinforcements 2 and 2'. The inner mechanical element 100 and the outer mechanical element 200 each can assume any shape. For example, in FIGS. 10 and 11, the outer mechanical element 200 comprises, in addition to the circular cylindrical wall 210, a bracket 220 surrounding the wall 210 around the axial direction X and fixed to this wall 210, this bracket 220 can be fixed to the bodywork of the motor vehicle, whereas the inner mechanical element 100 axially passing through the inner reinforcement 3 and 3' can be fixed to the engine of the motor vehicle. For example, in FIGS. 9 and 12, the wall 210 is one piece with a fixing component 230 comprising fixing brackets 231, for example, for fixing to the bodywork of the motor vehicle, whereas the inner mechanical element 100 axially passing through the inner reinforcement 3 and 3' can be bar shaped comprising fixing components 101, for example, in this case holes transversely passing through the element 100, in order to be fixed to the engine of the motor vehicle.

Of course, the articulations 1 and 1' can be cylindrical or frustoconical or any other circular shape.

Of course, in another embodiment of the invention, the articulations 1 and 1' can be one-piece, i.e. molded from a single part with one or more outer reinforcement(s) and with one or more inner reinforcement(s).

Of course, the above embodiments, features, possibilities and examples can be combined with each other or can be selected independently of each other.

The invention claimed is:

1. A first and second articulation for filtering and damping vibrations between an inner mechanical element and an outer mechanical element, the first articulation comprising:
   a rigid inner reinforcement inserted into the inner reinforcement in the axial direction X;
   a rigid outer reinforcement fixed to the outer mechanical element; and
   a ring made of at least one vibration damping elastomer material, which ring radially extends around the axial direction (X) between the inner reinforcement and the outer reinforcement and which is fixed to the inner reinforcement and to the outer reinforcement, the ring comprising a first side flank and a second side flank which are remote from each other in the axial direction (X) and which join the inner reinforcement to the outer reinforcement;
wherein the first side flank comprises at least one first ring portion defined by at least one first surface, and at least one second ring portion defined by at least one second surface which are diametrically opposed in relation to the axial direction (X) and which have, in the axial direction (X), respectively at least one first axial elevation and at least one second axial elevation that is higher than the at least one first axial elevation
the second articulation comprising:
   a second rigid inner reinforcement inserted into the inner reinforcement in the axial direction X;
   a second rigid outer reinforcement fixed to the outer mechanical element;
   a second ring made of the at least one vibration damping elastomer material, which ring radially extends around the axial direction (X) between the inner reinforcement and the outer reinforcement and which is fixed to the inner reinforcement and to the outer reinforcement, the ring comprising a first side flank and a second side flank which are remote from each other in the axial direction (X) and which join the inner reinforcement to the outer reinforcement;
   the outer mechanical element comprises a wall demarcating a first housing in which the outer reinforcement of the first articulation is fitted, and a second housing in which the outer reinforcement of the second articulation is fitted, and wherein the inner reinforcement of the first articulation and the inner reinforcement of the second articulation being aligned and surrounding the same axial direction (X);
   the at least one first axial elevation of the first articulation and the at least one second axial elevation of the first articulation are taken in relation to a transverse portion of the first side flank of the first articulation, or are taken in relation to a first transverse plane (P) passing through the center of the first side flank of the first articulation;
   the at least one first axial elevation of the at least one second articulation and the second axial elevation of the second articulation are taken in relation to the same transverse portion of the first side flank of the second articulation, or are taken in relation to a second transverse plane (P') passing through the center of the first side flank of the second articulation;
   the transverse portion of the first side flank of the first articulation or the first transverse plane (P) being located in the same plane perpendicular to the axial direction (X) and being separate from the at least one first surface of the first articulation and from the at least one second surface of the first articulation;
   the transverse portion of the first side flank of the second articulation or the second transverse plane (P') being located in the same plane perpendicular to the axial direction (X) and being separate from the at least one first surface of the second articulation and from the at least one second surface of the second articulation;
   the at least one first surface of the first articulation is aligned in the axial direction (X) with the at least one second surface of the second articulation, and having the at least one second axial elevation of the second articulation different from the at least one first axial elevation of the at least one first surface of the first articulation; and,
   the at least one second surface of the first articulation is aligned in the axial direction (X) with the at least one second surface of the second articulation, and having the at least one second axial elevation the second articulation is different from the at least one second axial elevation of the at least one second surface of the first articulation.

2. The articulation as claimed in claim 1, wherein the at least one first axial elevation and the at least one second axial elevation are taken in relation to a same transverse portion of a first lateral flank, the transverse portion being located in the same plane perpendicular to the axial direction (X) and being separate from the at least one first surface and from the at least one second surface.

3. The articulation as claimed in claim 1, wherein the at least one first axial elevation and the at least one second axial elevation are taken in relation to a transverse plane (P) passing through the center of the first side flank.

4. The articulation as claimed in claim 1, wherein the at least one first surface and the at least one second surface are respectively located on the first ring portion axially projecting from the first side flank and, on a second ring portion axially projecting from the first side flank.

5. The articulation as claimed in claim 1, wherein the at least one first surface and the at least one second surface are flat.

6. The articulation as claimed in claim 1, wherein the at least one first surface and the at least one second surface are flat and perpendicular to the axial direction (X).

7. The articulation as claimed in claim 1, wherein the first ring portion extends along a first arc of a circle centered on the axial direction (X), and the second ring portion extends along a second arc of a circle centered on the axial direction (X).

8. The articulation as claimed in claim 1, wherein the first ring portion and the second ring portion extend in a stepped manner around the axial direction (X).

9. The articulation as claimed in claim 1, wherein the at least one first surface and the at least one second surface cover 360° degrees around the axial direction (X).

10. The articulation as claimed in claim 1, wherein the first side flank comprises a plurality of first surfaces which are angularly offset around the axial direction (X) and which have first respective axial elevations and a plurality of second surfaces which are angularly offset around the axial direction (X) and which have second respective axial elevations, which are different from each other.

11. The articulation as claimed in claim 10, wherein the first side flank comprises two flat projections which axially depart from the first side flank, which extend along two first arcs of a circle centered on the axial direction (X), the two first surfaces of which are perpendicular to the axial direction (X), which are angularly offset around the axial direction (X) and which have respective first axial elevations which are different from each other; and, wherein the first side flank comprises, as second ring portions, two flat projections which axially depart from the first side flank, which extend along two second arcs of a circle centered on the axial direction (X), the second surfaces of which are perpendicular to the axial direction (X), which are angularly offset around the axial direction (X) and which have respective second axial elevations, which are different from each other.

12. The articulation as claimed in claim 1, the first side flank comprises third surfaces for transitioning between the at least one first surface and the at least one second surface.

13. The articulation device as claimed in claim 1, wherein the first side flank of the first articulation and the first side flank of the second articulation are axially rotatable outward, and wherein the second side flank of the first articulation and the second side flank of the second articulation are axially rotatable toward each other.

14. The articulation device as claimed in claim 1 further comprising an inner mechanical element which is fitted in the inner reinforcement of the first articulation and in the inner reinforcement of the second articulation.

* * * * *